(12) United States Patent
Nobori et al.

(10) Patent No.: US 10,659,677 B2
(45) Date of Patent: May 19, 2020

(54) CAMERA PARAMETER SET CALCULATION APPARATUS, CAMERA PARAMETER SET CALCULATION METHOD, AND RECORDING MEDIUM

(71) Applicant: Panasonic Intellectual Property Management Co., Ltd., Osaka (JP)

(72) Inventors: Kunio Nobori, Tokyo (JP); Nobuhiko Wakai, Osaka (JP); Satoshi Sato, Kyoto (JP); Takeo Azuma, Kyoto (JP)

(73) Assignee: PANASONIC INTELLECTUAL PROPERTY MANAGMENT CO., LTD., Osaka (JP)

( * ) Notice: Subject to any disclaimer, the term of this patent is extended or adjusted under 35 U.S.C. 154(b) by 15 days.

(21) Appl. No.: 16/031,465

(22) Filed: Jul. 10, 2018

(65) Prior Publication Data
US 2019/0028632 A1   Jan. 24, 2019

(30) Foreign Application Priority Data

Jul. 21, 2017   (JP) .................................. 2017-141417

(51) Int. Cl.
*H04N 5/232*   (2006.01)
*G06T 7/80*   (2017.01)
(Continued)

(52) U.S. Cl.
CPC ..... *H04N 5/23216* (2013.01); *G06K 9/00805* (2013.01); *G06T 7/70* (2017.01);
(Continued)

(58) Field of Classification Search
CPC ......... G06T 7/70; G06T 7/85; H04N 5/23216; H04N 5/23296; G06K 9/00805
See application file for complete search history.

(56) References Cited

U.S. PATENT DOCUMENTS 7,307,655 B1   12/2007   Okamoto et al.
2002/0191078 A1   12/2002   Okamoto et al.
(Continued)

FOREIGN PATENT DOCUMENTS

JP   2001-285692   10/2001
JP   2002-374523   12/2002
(Continued)

OTHER PUBLICATIONS

Roger Y. Tsai, "A Versatile Camera Calibration Technique for High-Accuracy 3D Machine Vision Metrology Using Off-The-Shelf TV Cameras and Lenses", IEEE Journal of Robotics and Automation, vol. RA-3, No. 4, Aug. 4, 1987, pp. 323-344.
(Continued)

*Primary Examiner* — Christopher K Peterson
(74) *Attorney, Agent, or Firm* — Wenderoth, Lind & Ponack, L.L.P.

(57) ABSTRACT

A camera parameter set calculation apparatus calculates three-dimensional coordinate sets based on a first image obtained by a first camera mounted on a mobile apparatus, a second image obtained by a second camera arranged on or in an object different from the mobile apparatus, a camera parameter set of the first camera, and a camera parameter set of the second camera, determines first pixel coordinate pairs obtained by projecting the three-dimensional coordinate sets onto the first image based on the first camera parameter set and second pixel coordinate pairs obtained by projecting the three-dimensional coordinate sets onto the second image based on the second camera parameter set, calculates an evaluation value based on pixel values at the first pixel coordinate pairs and pixel values at the second pixel coordinate pairs, and updates the camera parameter set of the first camera based on the evaluation value.

15 Claims, 10 Drawing Sheets

(51) Int. Cl.
*H04N 13/122* (2018.01)
*G06T 7/70* (2017.01)
*G06K 9/00* (2006.01)
*H04N 13/239* (2018.01)
*H04N 17/00* (2006.01)
*H04N 13/00* (2018.01)

(52) U.S. Cl.
CPC ........... *G06T 7/85* (2017.01); *H04N 5/23296* (2013.01); *H04N 13/122* (2018.05); *G06T 2207/30204* (2013.01); *G06T 2207/30252* (2013.01); *H04N 13/239* (2018.05); *H04N 17/002* (2013.01); *H04N 2013/0081* (2013.01)

(56) References Cited

U.S. PATENT DOCUMENTS

| | | |
|---|---|---|
| 2008/0181488 A1 | 7/2008 | Ishii et al. |
| 2011/0229013 A1* | 9/2011 | Huang ................. H04N 13/246 382/154 |
| 2015/0172633 A1 | 6/2015 | Nobori et al. |
| 2016/0176343 A1 | 6/2016 | Sakano et al. |
| 2018/0309978 A1* | 10/2018 | Nobori ................. H04N 13/239 |
| 2018/0316905 A1* | 11/2018 | Nobori ................. H04N 13/246 |
| 2018/0316906 A1* | 11/2018 | Nobori ................. H04N 13/246 |

FOREIGN PATENT DOCUMENTS

| | | |
|---|---|---|
| JP | 2008-187564 | 8/2008 |
| JP | 2015-133691 | 7/2015 |
| JP | 2015-179432 | 10/2015 |
| WO | 2000/007373 | 2/2000 |

OTHER PUBLICATIONS

C. Zach et al., "A duality based approach for realtime TV-L1 optical flow", In Proceedings of the 29th DAGM conference on Pattern recognition, 2007, pp. 214-223.

Takashi Matsuyama et al., "Computer Vision", New Technology Communications, Jun. 15, 1998, pp. 123-137 (Partial Translation).

* cited by examiner

CAMERA PARAMETER SET CALCULATION APPARATUS, CAMERA PARAMETER SET CALCULATION METHOD, AND RECORDING MEDIUM

BACKGROUND

1. Technical Field

The present disclosure relates to a camera parameter set calculation apparatus, a camera parameter set calculation method, and a recording medium.

2. Description of the Related Art

Numerous techniques for use in safety driving support systems for motor vehicles, surveillance camera systems for detecting suspicious people, or the like have been proposed for generating a new image using images captured by cameras and presenting the generated image to a user. For example, techniques disclosed in Japanese Patent No. 3286306 and Japanese Patent No. 4512293 include capturing an image of an area behind a vehicle by using a camera installed in the rear of the vehicle. The techniques further include generating an image that shows a top-down view of the area behind the vehicle from the captured image. The techniques enable generation of an image of an area behind the vehicle from a viewpoint that appears to be located above the vehicle looking down. By viewing the generated image, the driver is able to readily recognize conditions behind the vehicle, which are difficult to see directly from the driver's seat.

Generating a three-dimensionally deformed image, such as an image that shows a top-down view, from an image captured by a camera requires a camera parameter set of the camera. Calculation of a camera parameter set is referred to as camera calibration. Japanese Unexamined Patent Application Publication No. 2001-285692 and Roger Y. Tsai, "A Versatile Camera Calibration Technique for High-Accuracy 3D Machine Vision Metrology Using Off-the-Shelf TV Cameras and Lenses", Journal of Robotics and Automation, IEEE, August 1987, Vol. RA-3, No. 4, p. 323-344 (hereinafter, Non-Patent Literature 1) describes camera calibration in detail. For example, Non-Patent Literature 1 discloses a camera calibration technique as follows. Sets each including a three-dimensional coordinate set of a reference point for calibration and a pixel coordinate set (i.e., a pixel coordinate pair) of an image of the reference point is prepared. The image of the reference point is included in an image captured by a camera. A distance (also referred to as a reprojection error) between a point obtained by projecting the reference point at each three-dimensional coordinate set onto the image by using image camera parameters and the corresponding pixel coordinate pair of the reference point is further calculated. In addition, a camera parameter set that minimizes a total sum of the reprojection errors of the reference points is calculated.

SUMMARY

The calibration techniques of the related art require reference points, that is, sets each including a three-dimensional coordinate set of a reference point and a pixel coordinate pair of the reference point. In order to acquire the three-dimensional coordinate sets of the reference points, either a calibration marker that includes known three-dimensional coordinate sets or a three-dimensional measurement device that measures the three-dimensional coordinate sets of the reference points is required. That is, special equipment or apparatus for acquiring three-dimensional coordinate sets of reference points is required.

One non-limiting and exemplary embodiment provides a camera parameter set calculation apparatus, a camera parameter set calculation method, and a recording medium that enable camera calibration without previously preparing three-dimensional coordinate sets of reference points.

In one general aspect, the techniques disclosed here feature a camera parameter set calculation apparatus including a control circuit that calculates a camera parameter set of a first camera mounted on a mobile apparatus. The control circuit (a1) acquires a first image captured by the first camera after the mobile apparatus stops at a predetermined location and a second image captured by a second camera arranged on or in an object different from the mobile apparatus in such a manner that an absolute position of the second camera remains fixed to the object, (a2) acquires a first camera parameter set of the first camera and a second camera parameter set of the second camera, (a3) calculates three-dimensional coordinate sets based on the first image, the second image, the first camera parameter set, and the second camera parameter set, (a4) determines (i) first pixel coordinate pairs obtained by projecting the three-dimensional coordinate sets onto the first image based on the first camera parameter set and (ii) second pixel coordinate pairs obtained by projecting the three-dimensional coordinate sets onto the second image based on the second camera parameter set, (a5) calculates an evaluation value based on pixel values at the first pixel coordinate pairs in the first image and pixel values at the second pixel coordinate pairs in the second image, (a6) updates the first camera parameter set based on the evaluation value, and (a7) outputs the updated first camera parameter set.

A camera parameter set calculation technique according to an aspect of the present disclosure enables camera calibration without previously preparing three-dimensional coordinate sets of reference points.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

DETAILED DESCRIPTION

Figure 1:
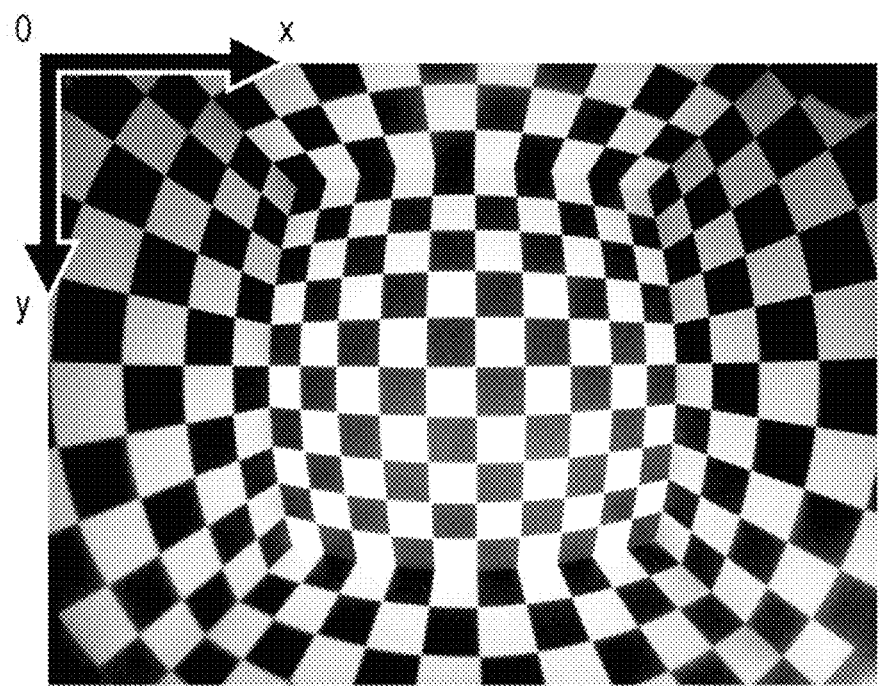
FIG. 1 is a schematic diagram illustrating an example calibration marker of the related art.

Underlying Knowledge Forming Basis of the Present Disclosure

The inventors have found the following issues in the camera calibration described in the "BACKGROUND" section. Specifically, numerous techniques for use in safety driving support systems for motor vehicles, surveillance camera systems for detecting suspicious people, or the like have been proposed for making the surroundings of a vehicle or a monitored area easily visible to a user. Such techniques include techniques for generating an image from an image captured by a camera, and techniques for superimposing an auxiliary line on an image captured by a camera as a reference for locating a position. Such image processing requires a camera parameter set of a camera, such as the position and orientation, focal distance, and the position of the center of the optical axis of the camera. A camera parameter set of a camera is also required for purposes other than the image generation described above, such as the acquisition of a three-dimensional coordinate set of a subject from images captured by cameras by using stereoscopy or motion stereoscopy.

A camera parameter set represents, when an image of a certain point on a subject is captured by a camera, a relationship between a three-dimensional coordinate set of the certain point and a two-dimensional coordinate set (i.e., a two-dimensional coordinate pair) (also referred to as a pixel coordinate pair) of the image. The camera parameter set depends on a camera model and includes parameters. Calculation of a camera parameter set is referred to as camera calibration. More specifically, a camera parameter set includes two camera parameter sets, namely, an extrinsic parameter set and an intrinsic parameter set. The extrinsic parameter set represents a positional relationship between a three-dimensional world coordinate system determined with reference to the imaging space of a camera and a three-dimensional camera coordinate system determined with reference to the camera. The intrinsic parameter set represents a relationship between a three-dimensional coordinate set of a subject in the camera coordinate system and the position of the subject on an image captured by the camera.

The term "coordinate pair", as used herein, refers to a single combination of a coordinate for one axis and a coordinate for another axis in a two-dimensional coordinate system.

The term "coordinate set", as used herein, refers to a single combination of a coordinate for one axis, a coordinate for another axis, and a coordinate for still another axis in a three-dimensional coordinate system.

Exemplary Calibration Techniques of Related Art

In the camera calibration technique disclosed in Non-Patent Literature 1, sets each including a three-dimensional coordinate set of a reference point and a pixel coordinate pair of the reference point are prepared and used as input elements. Further, a camera parameter set that minimizes a total sum of distances (geometric reprojection errors) is calculated. Each of the distances is provided between a point obtained by projecting the reference point at the three-dimensional coordinate set onto an image by using camera parameters and the pixel coordinate pair of the reference point.

A calibration marker with a specific pattern is commonly used to obtain sets each including a three-dimensional coordinate set of a reference point and a pixel coordinate pair of the reference point. FIG. 1 illustrates an example of the calibration marker. In the example illustrated in FIG. 1, a pattern of lattices is provided on the inner side of a box-shaped subject such that the lattices are arranged at certain intervals. Each lattice point, that is, each corner of each lattice, is defined as a reference point, and a design value set for a three-dimensional coordinate set of the lattice point, which is the reference point, or a measured three-dimensional coordinate set of the reference point, which is obtained after the reference point is placed, is stored. Further, an image of the reference point is captured by a camera, and a pixel coordinate pair of the imaged reference point is estimated through image processing to obtain a set including the three-dimensional coordinate set of the reference point and the pixel coordinate pair of the imaged reference point. Such a calibration technique using a calibration marker requires equipment or the like including the calibration marker. On the contrary, this calibration technique provides high-accuracy calibration and thus can be used in calibration at factories after production of cameras.

However, the calibration techniques of the related art require reference points, that is, sets each including a three-dimensional coordinate set of a reference point and a pixel coordinate pair of an imaged reference point. In order to acquire the three-dimensional coordinate sets of the reference points, either a calibration marker that includes known three-dimensional coordinate sets or a three-dimensional measurement device that measures the three-dimensional coordinate sets of the reference points is required. To address such an issue, the inventors have developed a camera parameter estimation technique for calculating "optical" reprojection errors (brightness constraint) as evaluation values, in place of a camera parameter estimation technique as in the calibration techniques of the related art for calculating "geometric" reprojection errors as evaluation values by using sets, each including a three-dimensional coordinate set of a reference point and a pixel coordinate pair of the imaged reference point, as input elements. The brightness constraint indicates that when two cameras capture the same subject to obtain two camera images, that is, when the same subject appears in two camera images, and the respective camera parameters of the two cameras have been correctly determined, the pixel values of points in the two camera images corresponding to a three-dimensional coordinate set of a given point on the subject are equal. The larger the difference between the two pixel values is, the larger errors included in the camera parameters are. Accordingly, the inventors have developed the following technique for performing camera calibration by using optical reprojection errors as evaluation values.

A camera parameter set calculation apparatus according to an aspect of the present disclosure includes a control circuit that calculates a camera parameter set of a first camera mounted on a mobile apparatus, wherein the control circuit (a1) acquires a first image captured by the first camera after the mobile apparatus stops at a predetermined location and a second image captured by a second camera arranged on or in an object different from the mobile apparatus in such a manner that an absolute position of the second camera remains fixed to the object, (a2) acquires a first camera parameter set of the first camera and a second camera parameter set of the second camera, (a3) calculates three-dimensional coordinate sets based on the first image, the second image, the first camera parameter set, and the second camera parameter set, (a4) determines (i) first pixel coordinate pairs obtained by projecting the three-dimensional coordinate sets onto the first image based on the first camera parameter set and (ii) second pixel coordinate pairs obtained by projecting the three-dimensional coordinate sets onto the second image based on the second camera parameter set, (a5) calculates an evaluation value based on pixel values at the first pixel coordinate pairs in the first image and pixel values at the second pixel coordinate pairs in the second image, (a6) updates the first camera parameter set based on the evaluation value, and (a7) outputs the updated first camera parameter set.

According to the aspect described above, the first camera parameter set of the first camera can be updated and outputted by using the second camera as a reference camera for camera calibration, that is, as a calibration camera. That is, the first camera can be subjected to camera calibration. Specifically, the first image of the first camera on the mobile apparatus, which stops at a predetermined location, and the second image of the second camera show images of the same subject. That is, the predetermined location is determined so that the first image and the second image include images of the same subject. The use of the first image and the second image enables the calculation of a three-dimensional coordinate set corresponding to an image of the same subject included in the first image and an image of the same subject included in the second image. In addition, a first pixel coordinate pair obtained by projecting the three-dimensional coordinate set onto the first image can be determined based on the first camera parameter set, and a second pixel coordinate pair obtained by projecting the three-dimensional coordinate set onto the second image can be determined based on the second camera parameter set. Thus, an evaluation value can be calculated based on a pixel value at the first pixel coordinate pair and a pixel value at the second pixel coordinate pair, and the first camera parameter set can be updated based on the calculated evaluation value. The process described above enables the first camera parameter set to be updated even when the first camera and the second camera are away from each other or are oriented in different directions. The image of the same subject included in the first image and the image of the same subject included in the second image are extracted from the first image and the second image, respectively. The same subject is not a preset reference whose coordinates or the like is known. Thus, there is no need for sets, each including a three-dimensional coordinate set of a known reference point and a pixel coordinate pair of the reference point, to associate three-dimensional coordinate sets and pixel coordinate pairs with each other in the process for updating the first camera parameter set. Therefore, camera calibration can be performed without using a calibration marker including known three-dimensional coordinate sets or a three-dimensional measurement device that measures a three-dimensional coordinate set of a reference point.

When the second camera parameter set is correct and the first camera parameter set is correct, a pixel value in the first image at a first pixel coordinate pair corresponding to a three-dimensional coordinate set of a certain point and a pixel value in the second image at a second pixel coordinate pair corresponding to the three-dimensional coordinate set of the certain point are equal. In contrast, for example, when the second camera parameter set is correct but the first camera parameter set is farther away from correct values (also referred to as "true values"), that is, the first camera parameter set includes more errors, the difference between the pixel value in the first image and the pixel value in the second image becomes larger. Accordingly, if the first camera parameter set includes an error, the first camera parameter set is updated based on the difference between the pixel value in the first image and the pixel value in the second image such that, for example, the difference is minimized, thereby obtaining a correct first camera parameter set. That is, the first camera can be calibrated.

In the camera parameter set calculation apparatus according to the aspect of the present disclosure, the first pixel coordinate pairs and the three-dimensional coordinate sets may be in a one-to-one relationship and the second pixel coordinate pairs and the three-dimensional coordinate sets may be in a one-to-one relationship, and in the (a4), the control circuit may determine each of the first pixel coordinate pairs by performing coordinate transformation on a corresponding three-dimensional coordinate set by using one or more camera parameters included in the first camera parameter set, and determine each of the second pixel coordinate pairs by performing coordinate transformation on a corresponding three-dimensional coordinate set by using one or more camera parameters included in the second camera parameter set. The aspect described above facilitates calculation of the first pixel coordinate pairs from the three-dimensional coordinate sets and the second pixel coordinate pairs from the three-dimensional coordinate sets.

In the camera parameter set calculation apparatus according to the aspect of the present disclosure, the (a3) may include (a3-1) extracting pairs of corresponding points, each of the pairs of corresponding points including a first corresponding point included in the first image and a second corresponding point included in the second image, based on a pixel value at the first corresponding point and a pixel value at the second corresponding point, images of an identical point on a subject being shown at the first corresponding point and the second corresponding point, and (a3-2) calculating the three-dimensional coordinate sets, based on the pairs of corresponding points, the first camera parameter set, and the second camera parameter set, the three-dimensional coordinate sets and the pairs of corresponding points being in a one-to-one relationship.

In the camera parameter set calculation apparatus according to the aspect of the present disclosure, the three-dimensional coordinate sets may be represented by $(x1, y1, z1), \ldots (xi, yi, zi), \ldots,$ and $(xn, yn, zn)$, the first pixel coordinate pairs may be represented by $(u11, v11), \ldots (u1i, v1i), \ldots,$ and $(u1n, v1n)$, the second pixel coordinate pairs may be represented by $(u21, v21), \ldots (u2i, v2i), \ldots,$ and (u2n, v2n), where 1<i≤n, the i and the n being natural numbers, the (xi, yi, zi) may correspond to the (u1i, v1i), the (xi, yi, zi) may correspond to the (u2i, v2i), a pixel value at the (u1i, v1i) may be represented by I1(u1i, v1i), and a pixel value at the (u2i, v2i) may be represented by I2(u2i, v2i). In the (a5), the control circuit may calculate the evaluation value based on a difference Di between the I1(u1i, v1i) and the I2(u2i, v2i). According to the aspect described above, if there is a difference between a pixel value at a first pixel coordinate pair in the first image and a pixel value at a second pixel coordinate pair in the second image, for example, it can be determined that the first camera parameter set includes an error from the true values. Therefore, it can be easily determined whether the first camera parameter set is good. In addition, for example, the first camera parameter set is modified, or updated, so as to minimize the difference, thereby appropriately adjusting the first camera parameter set.

In the camera parameter set calculation apparatus according to the aspect of the present disclosure, in the (a5), the control circuit may calculate the evaluation value based on $\Sigma_{i=1}^{n} Di$. According to the aspect described above, with the use of multiple differences, the accuracy of the evaluation value can be improved. In addition, for example, the first camera parameter set is updated so as to reduce the sum of the differences, thereby optimizing the first camera parameter set.

In the camera parameter set calculation apparatus according to the aspect of the present disclosure, in the (a5), the control circuit may calculate the evaluation value based on $\Sigma_{i=1}^{n} |Di|$. According to the aspect described above, with the use of the absolute values of the differences, the differences can be prevented from being canceled out during the calculation of an evaluation value. Therefore, an evaluation value can be accurately calculated.

In the camera parameter set calculation apparatus according to the aspect of the present disclosure, in the (a5), the control circuit may calculate the evaluation value based on $\Sigma_{i=1}^{n} (Di \times Di)$. According to the aspect described above, since the square of the difference of each of the differences is always positive, the differences can be prevented from being canceled out during the calculation of an evaluation value. In the evaluation value, a larger difference may be reflected more and a smaller difference may be reflected less. Therefore, the magnitudes of the differences can be emphasized when reflected in the evaluation value.

In the camera parameter set calculation apparatus according to the aspect of the present disclosure, the absolute position may be a position relative to the Earth. According to the aspect described above, the second camera remains fixed with respect to the Earth. Thus, the second camera remains stationary and thus the second camera parameter set is maintained after the second camera parameter set has been calibrated. Therefore, the update of the first camera parameter set of the first camera using the second camera as a reference camera, that is, as a calibration camera, is facilitated.

A camera parameter set calculation method according to another aspect of the present disclosure is a camera parameter set calculation method for calculating a camera parameter set of a first camera mounted on a mobile apparatus by using a second camera arranged on or in an object different from the mobile apparatus in such a manner that an absolute position of the second camera remains fixed to the object. The camera parameter set calculation method includes (a1) acquiring a first image captured by the first camera after the mobile apparatus stops at a predetermined location and a second image captured by the second camera; (a2) acquiring a first camera parameter set of the first camera and a second camera parameter set of the second camera; (a3) calculating three-dimensional coordinate sets based on the first image, the second image, the first camera parameter set, and the second camera parameter set; (a4) determining (i) first pixel coordinate pairs obtained by projecting the three-dimensional coordinate sets onto the first image based on the first camera parameter set and (ii) second pixel coordinate pairs obtained by projecting the three-dimensional coordinate sets onto the second image based on the second camera parameter set; (a5) calculating an evaluation value based on pixel values at the first pixel coordinate pairs in the first image and pixel values at the second pixel coordinate pairs in the second image; (a6) updating the first camera parameter set based on the evaluation value; and (a7) outputting the updated first camera parameter set. At least one of the (a1) to (a7) is executed by a processor. According to the aspect described above, advantages similar to those of the camera parameter set calculation apparatus according to the aspect of the present disclosure can be achieved.

In the camera parameter set calculation method according to the aspect of the present disclosure, the first pixel coordinate pairs and the three-dimensional coordinate sets may be in a one-to-one relationship and the second pixel coordinate pairs and the three-dimensional coordinate sets may be in a one-to-one relationship, and in the (a4), each of the first pixel coordinate pairs may be determined by performing coordinate transformation on a corresponding three-dimensional coordinate set by using one or more camera parameters included in the first camera parameter set, and each of the second pixel coordinate pairs may be determined by performing coordinate transformation on a corresponding three-dimensional coordinate set by using one or more camera parameters included in the second camera parameter set.

In the camera parameter set calculation method according to the aspect of the present disclosure, the (a3) may include (a3-1) extracting pairs of corresponding points, each of the pairs of corresponding points including a first corresponding point included in the first image and a second corresponding point included in the second image, based on a pixel value at the first corresponding point and a pixel value at the second corresponding point, images of an identical point on a subject being shown at the first corresponding point and the second corresponding point, and (a3-2) calculating the three-dimensional coordinate sets based on the pairs of corresponding points, the first camera parameter set, and the second camera parameter set, the three-dimensional coordinate sets and the pairs of corresponding points being in a one-to-one relationship.

In the camera parameter set calculation method according to the aspect of the present disclosure, the three-dimensional coordinate sets may be represented by (x1, y1, z1), . . . (xi, yi, zi), . . . , and (xn, yn, zn), the first pixel coordinate pairs may be represented by (u11, v11), . . . (u1i, v1i), . . . , and (u1n, v1n), the second pixel coordinate pairs may be represented by (u21, v21), . . . (u2i, v2i), . . . , and (u2n, v2n), where 1<i≤n, the i and the n being natural numbers, the (xi, yi, zi) may correspond to the (u1i, v1i), the (xi, yi, zi) may correspond to the (u2i, v2i), a pixel value at the (u1i, v1i) may be represented by I1(u1i, v1i), and a pixel value at the (u2i, v2i) may be represented by I2(u2i, v2i). In the (a5), the evaluation value may be calculated based on a difference Di between the I1(u1i, v1i) and the I2(u2i, v2i).

In the camera parameter set calculation method according to the aspect of the present disclosure, in the (a5), the evaluation value may be calculated based on $\Sigma_{i=1}{}^{n}Di$.

In the camera parameter set calculation method according to the aspect of the present disclosure, in the (a5), the evaluation value may be calculated based on $\Sigma_{i=1}{}^{n}|Di|$.

In the camera parameter set calculation method according to the aspect of the present disclosure, in the (a5), the evaluation value may be calculated based on $\Sigma_{i=1}{}^{n}(Di \times Di)$.

In the camera parameter set calculation method according to the aspect of the present disclosure, the absolute position may be a position relative to the Earth.

A recording medium according to still another aspect of the present disclosure is a recording medium storing a control program for causing a device including a processor to execute a process, the recording medium being a non-volatile computer-readable recording medium. The process includes (a1) acquiring a first image captured by a first camera after a mobile apparatus stops at a predetermined location and a second image captured by a second camera, the first camera being mounted on the mobile apparatus, the second camera being arranged on or in an object different from the mobile apparatus in such a manner that an absolute position of the second camera remains fixed to the object; (a2) acquiring a first camera parameter set of the first camera and a second camera parameter set of the second camera; (a3) calculating three-dimensional coordinate sets based on the first image, the second image, the first camera parameter set, and the second camera parameter set; (a4) determining (i) first pixel coordinate pairs obtained by projecting the three-dimensional coordinate sets onto the first image based on the first camera parameter set and (ii) second pixel coordinate pairs obtained by projecting the three-dimensional coordinate sets onto the second image based on the second camera parameter set; (a5) calculating an evaluation value based on pixel values at the first pixel coordinate pairs in the first image and pixel values at the second pixel coordinate pairs in the second image; (a6) updating the first camera parameter set based on the evaluation value; and (a7) outputting the updated first camera parameter set. According to the aspect described above, advantages similar to those of the camera parameter set calculation apparatus according to the aspect of the present disclosure can be achieved.

It should be noted that the general or specific aspects described above may be implemented as a system, an apparatus, a method, an integrated circuit, a computer program, or a computer-readable recording medium such as a recording disc, or any selective combination thereof. Examples of the computer-readable recording medium include a non-volatile recording medium such as a compact disc-read only memory (CD-ROM).

The following describes a camera parameter set calculation apparatus and the like according to an embodiment with reference to the drawings. The following embodiment describes general or specific examples. Numerical values, shapes, materials, constituent elements, arrangement positions and connection forms of the constituent elements, steps, the order of the steps, and so on in the following embodiment are merely examples and are not intended to limit the present disclosure. The constituent elements mentioned in the following embodiment are described as optional constituent elements unless they are specified in independent claims that define the present disclosure in its broadest concept. The following description of the embodiment may include expressions with the term "approximately", such as approximately parallel or approximately perpendicular. For example, the expression "approximately parallel" is used to mean not only the state of being exactly parallel but also the state of being substantially parallel, that is, the state of being parallel with an error of several percent, for example. This also applies to other expressions with "approximately".

Embodiment

1. Configuration of Camera System

A camera system 10 including a camera parameter set calculation apparatus 111 according to an embodiment of the present disclosure will be described. As a non-limiting example, this embodiment describes the camera system 10 as a camera system to be used in a camera mounted on a mobile apparatus. The camera system 10 preforms camera calibration on a camera mounted on a mobile apparatus by using the camera parameter set calculation apparatus 111.

Figure 2:
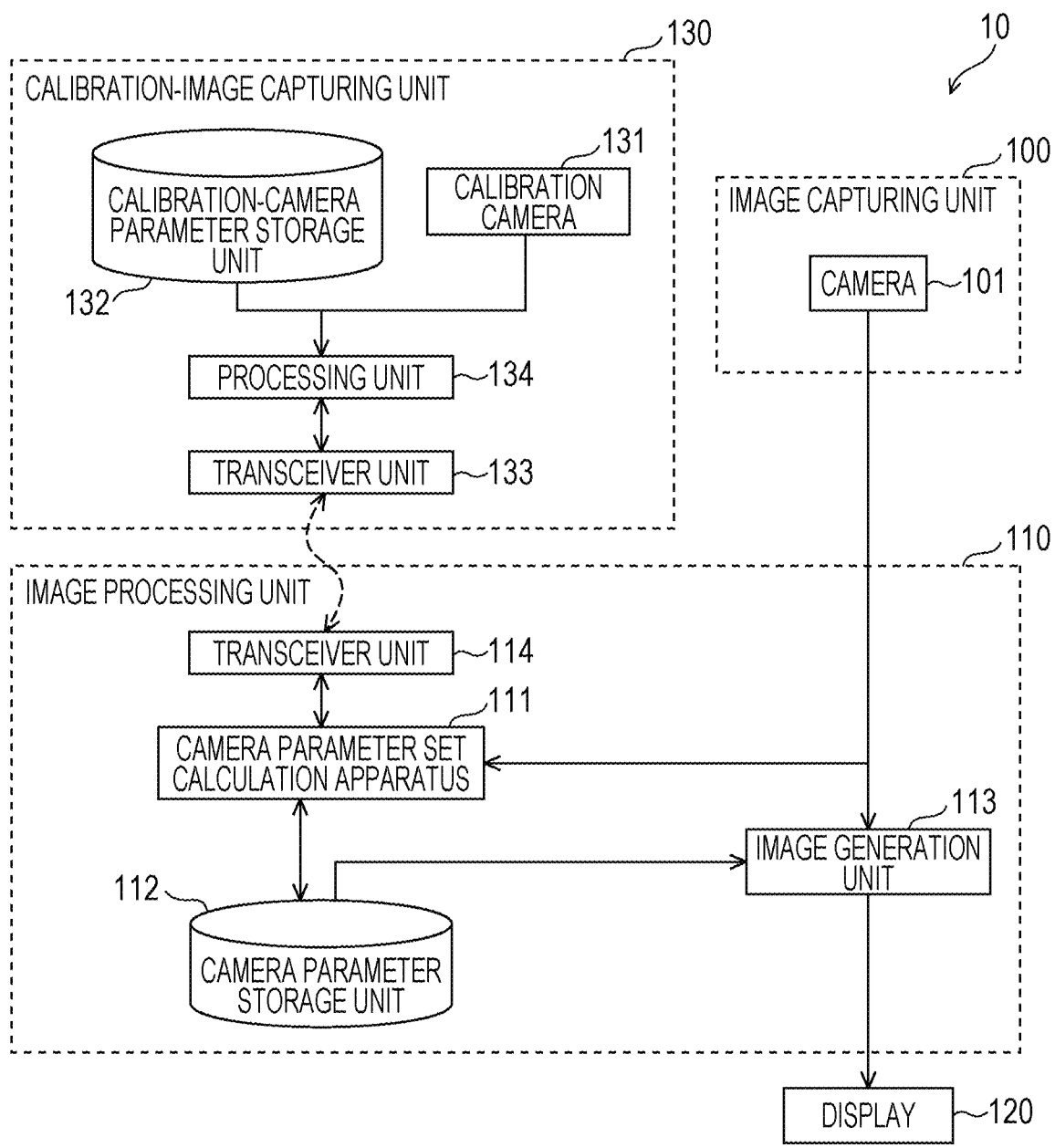
FIG. 2 is a block diagram illustrating the functional configuration of a camera system according to an embodiment.

Referring to FIG. 2, illustrated is a block diagram illustrating the functional configuration of the camera system 10 including the camera parameter set calculation apparatus 111 according to the embodiment. As illustrated in FIG. 2, the camera system 10 includes an image capturing unit 100, an image processing unit 110, a display 120, and a calibration-image capturing unit 130. As a non-limiting example, in this embodiment, the image capturing unit 100, the image processing unit 110, and the display 120 are mounted on a mobile apparatus, and the calibration-image capturing unit 130 is arranged in or on a target object other than the mobile apparatus, with the position of the calibration-image capturing unit 130 being fixed. That is, the calibration-image capturing unit 130 is not mounted on the mobile apparatus. Note that a portion of the image processing unit 110 may be arranged in or on the target object in a manner similar to that of the calibration-image capturing unit 130.

The target object may be any object in or on which the absolute position of the calibration-image capturing unit 130 can be fixed. The absolute position of the calibration-image capturing unit 130 is a position of the calibration-image capturing unit 130 relative to the Earth. For example, the target object may be an object in or on which the absolute position of the calibration-image capturing unit 130 can be fixed at least during the camera calibration of the image capturing unit 100. The target object is arranged separately from the mobile apparatus and does not move along with the mobile apparatus. In addition, the position of the target object does not change independently of the movement of the mobile apparatus. Examples of the target object include a structure and equipment whose positions are fixed to the ground, and a building.

The mobile apparatus on which the image capturing unit 100 and so on are mounted may be a vehicle, that is, a means of transport. For example, the mobile apparatus may be a motor vehicle or a vehicle other than a motor vehicle, or may be a ship or an aircraft. Examples of the vehicle other than a motor vehicle include a truck, a bus, a two-wheeled vehicle, a vehicle for conveyance, a railroad, a construction machine, and cargo-handling equipment. Alternatively, the mobile apparatus may be a vehicle or robot remotely controlled by a user. This embodiment describes an example in which the mobile apparatus is a motor vehicle.

Figure 3:
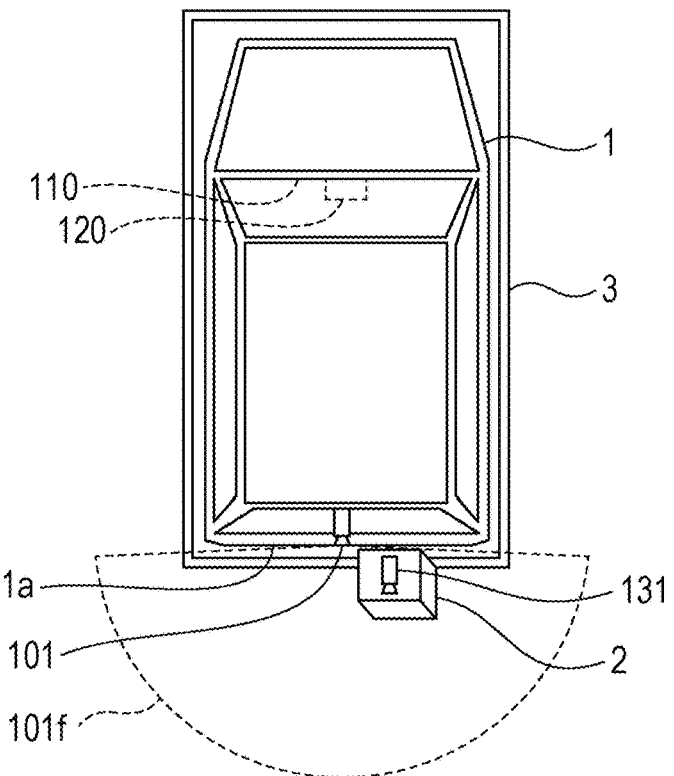
FIG. 3 is a plan view of a motor vehicle including the camera system according to the embodiment in an example.

The image capturing unit 100 captures and acquires an image of a subject and outputs the image to the image processing unit 110. The image capturing unit 100 includes at least one camera 101. In this embodiment, the image capturing unit 100 includes one camera 101. For example, a motor vehicle 1 including the camera system 10 according to the embodiment in an example is illustrated in FIG. 3 in a plan view form. As a non-limiting example, in this embodiment, the camera 101 is arranged in a rear portion 1a of one motor vehicle 1 to capture an image of an area behind the motor vehicle 1. The image processing unit 110 and the display 120 are installed in, for example, a passenger compartment so as to be visible to the driver. The camera 101 has a fish-eye lens with a field of view of approximately 180 degrees to capture a wide-area image. As indicated by a dashed line in FIG. 3, the camera 101 has a nearly hemispherical, cone-shaped field of view 101f. The camera 101 is an example of a first camera.

Figure 4:
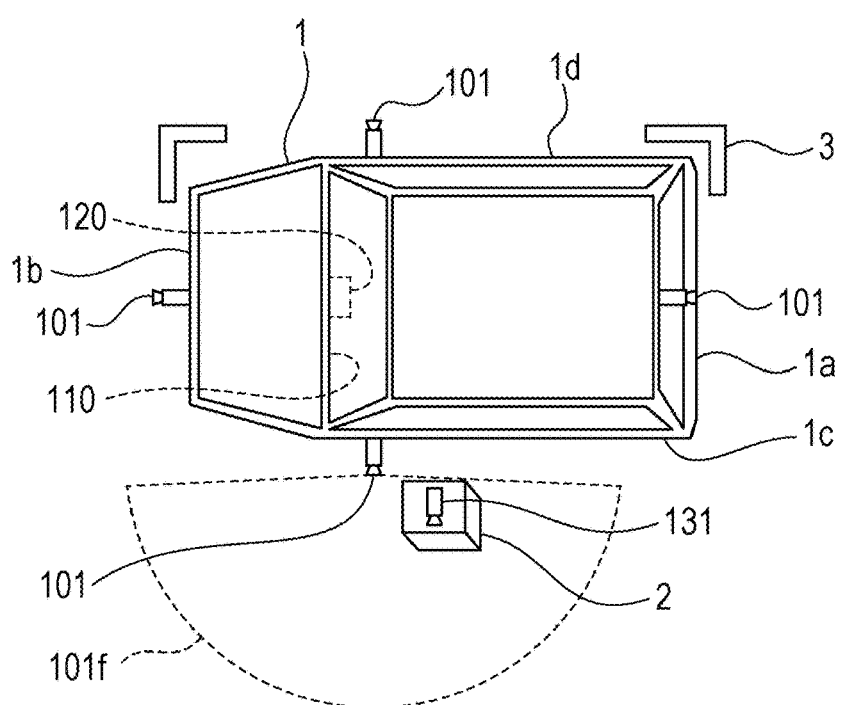
FIG. 4 is a plan view of a motor vehicle including the camera system according to the embodiment in another example.

In this embodiment, the image capturing unit 100 includes one camera 101. However, the image capturing unit 100 does not necessarily include one camera 101 and may include two or more cameras 101. For example, as illustrated in FIG. 4, the image capturing unit 100 may include cameras 101 arranged in a front portion 1b, the rear portion 1a, a left side portion 1c, and a right side portion 1d of the motor vehicle 1 to capture images of areas in the front of, behind, and on the left and right sides of the motor vehicle 1, respectively. The term "left side portion of the motor vehicle 1" refers to the left-hand side when viewed from the rear. Therefore, the four cameras 101 can be arranged to surround the periphery of the motor vehicle 1 and can have fields of view covering the horizontal 360-degree surroundings of the motor vehicle 1.

Referring to FIG. 2, the image processing unit 110 processes an image (hereinafter also referred to as a camera image) captured by the image capturing unit 100 and outputs a processing result to the display 120 or the like. The image processing unit 110 includes the camera parameter set calculation apparatus 111, a camera parameter storage unit 112, an image generation unit 113, and a transceiver unit 114. The camera parameter set calculation apparatus 111 is also referred to as a calibrator.

The display 120 displays an image output from the image processing unit 110, for example. The display 120 may be a display panel such as a liquid crystal panel or an organic or inorganic electroluminescent (EL) panel.

The calibration-image capturing unit 130 captures and acquires an image and outputs the captured image to the image processing unit 110. Further, the calibration-image capturing unit 130 outputs a camera parameter set thereof to the image processing unit 110. The calibration-image capturing unit 130 includes at least one calibration camera 131, a calibration-camera parameter storage unit 132, a transceiver unit 133, and a processing unit 134. The calibration camera 131 has a fish-eye lens with a field of view of approximately 180 degrees. The calibration camera 131 is a camera whose accurate extrinsic camera parameters and accurate intrinsic camera parameters are known. The calibration camera 131 has been subjected to camera calibration. The extrinsic camera parameters have values equal to or nearly equal to true values and intrinsic camera parameters of the calibration camera 131 have values equal to or nearly equal to true values. For example, the value of a camera parameter nearly equal to a true value may be the value of a camera parameter whose difference from the true value does not change if a process for calibrating the camera parameter is performed. The calibration camera 131 is an example of a second camera.

The camera system 10 having the configuration described above performs mainly two operations, namely, image generation and calibration. In the image generation operation, the image capturing unit 100 captures an image and outputs the image to the image processing unit 110, the image processing unit 110 generates an image from the input image and outputs the generated image, and the display 120 displays the image. In the calibration operation, the image capturing unit 100 captures an image and outputs the image to the image processing unit 110, and the camera parameter set calculation apparatus 111 of the image processing unit 110 updates the camera parameter set of the camera 101, which is stored in the camera parameter storage unit 112. The two operations, namely, image generation and calibration, may be performed simultaneously or separately.

The image processing unit 110 and the calibration-image capturing unit 130 will now be described in further detail. As illustrated in FIG. 2, the image processing unit 110 includes the camera parameter set calculation apparatus 111, the camera parameter storage unit 112, the image generation unit 113, and the transceiver unit 114.

The camera parameter storage unit 112 stores in advance at least the camera parameter set of the camera 101 and occlusion information. The occlusion information is information on a region in the camera image that is occluded by the image capturing unit 100. The camera parameter set of the camera 101 may include an extrinsic parameter set, such as the position and orientation of the camera 101, and an intrinsic parameter set, such as the lens distortion and focal distance of the camera 101. The camera parameter storage unit 112 is implemented as a storage device, for example, a semiconductor memory such as a read-only memory (ROM), a random access memory (RAM), or a flash memory, a hard disk drive, or a solid state drive (SSD).

The camera parameter set calculation apparatus 111, which is also a calibrator, updates a camera parameter set stored in the camera parameter storage unit 112. Specifically, the camera parameter set calculation apparatus 111 updates a camera parameter set by using the camera image captured by the camera 101, the camera parameter set of the camera 101 stored in the camera parameter storage unit 112, the camera image captured by the calibration camera 131, and the camera parameter set of the calibration camera 131. The camera parameter set of the camera 101 stored in the camera parameter storage unit 112 is used as an initial camera parameter set. The initial camera parameter set may be a camera parameter set of the camera 101 that has already been stored in the camera parameter storage unit 112. For example, the initial camera parameter set may be a camera parameter set that is determined when the camera 101 is designed, or may be a camera parameter set that is set in the camera 101 during use.

The image generation unit 113 generates an image based on the camera image captured by the camera 101 and the camera parameter set stored in the camera parameter storage unit 112, and outputs the generated image.

The transceiver unit 114 transmits and receives information to and from the calibration-image capturing unit 130. Examples of the information to be received include identification information about the calibration camera 131, the camera image captured by the calibration camera 131, and the camera parameter set of the calibration camera 131. Examples of the information to be transmitted include identification information about the motor vehicle 1, identification information about the image capturing unit 100, and an instruction for performing camera calibration. The transceiver unit 114 may include a communication circuit and may be configured to transmit and receive information to and from the calibration-image capturing unit 130 via a communication device included in the motor vehicle 1. As a non-limiting example, in this embodiment, the transceiver unit 114 wirelessly communicates with the transceiver unit 133 of the calibration-image capturing unit 130. Examples of the wireless communication may include wireless communication over a communication network such as a wireless local area network (LAN) based on Wi-Fi (registered trademark) (Wireless Fidelity) or the like, short range wireless communication such as Bluetooth (registered trademark) or ZigBee (registered trademark), and any other wireless communication. The transceiver unit 114 may transmit and receive information to and from the calibration-image capturing unit 130 via wired communication or may transmit and receive information to and from the calibration-image capturing unit 130 via a computer-readable recording medium.

The constituent elements of the image processing unit 110, which are realized by the camera parameter set calculation apparatus 111 and the image generation unit 113, may be implemented by hardware such as electronic circuits or integrated circuits or may be implemented by software in accordance with a program executed on a computer.

As illustrated in FIG. 2, furthermore, the calibration-image capturing unit 130 includes the calibration camera 131, the calibration-camera parameter storage unit 132, the transceiver unit 133, and the processing unit 134. As described above, the calibration camera 131 is a camera whose accurate camera parameter set is known and which has been subjected to camera calibration. The calibration camera 131 is arranged to be fixed to a target object in or on which the position of the calibration camera 131 can be fixed with respect to the Earth. For example, as illustrated in FIG. 3, the calibration camera 131 may be attached to a target object 2 such as a pillar. The target object 2 is arranged to be fixed with respect to the ground, that is, the Earth. The calibration camera 131 undergoes camera calibration in a state where the calibration camera 131 is fixed to the target object 2. The accurate camera parameter set of the calibration camera 131 after camera calibration is stored in the calibration-camera parameter storage unit 132.

As described in detail below, the calibration-image capturing unit 130 is used as a reference for performing camera calibration on the camera 101 of the image capturing unit 100. That is, the calibration camera 131 is used as a reference camera for performing camera calibration on the camera 101. To this end, it is preferable that the camera parameter set of the calibration camera 131 after camera calibration does not change. Thus, the calibration camera 131 may be fixed to a target object arranged to be fixed with respect to the Earth so that, in particular, the extrinsic parameter set will not be changed. As in this embodiment, when the image capturing unit 100 is mounted on the motor vehicle 1, the calibration camera 131 may be arranged in a facility or equipment available for the user of the motor vehicle 1. Examples of the facility in which the calibration camera 131 is arranged include a vehicle maintenance workshop, a vehicle dealer, an automotive product store, a gas station, a parking lot, a highway service area, a convenience store, and other stores. The calibration camera 131 may be arranged on the wall, column, or the like in such a facility. Examples of the equipment on which the calibration camera 131 is arranged include a structure on the road. Examples of the structure on the road include a traffic signal mast, a road sign, a utility pole, a street light, and a roadside device. Alternatively, a surveillance camera on the road or a camera of public equipment such as a camera of an automatic license plate reader may also be used as the calibration camera 131.

However, the target object may be movable if the target object can accurately detect the extrinsic camera parameters of the calibration camera 131, such as the position and orientation of the calibration camera 131, even when the target object is moving. For example, when the target object is a mechanical arm such as a robot arm, the extrinsic parameter set of the calibration camera 131, which is attached to an end of the arm, can be calculated from the amount of movement of a joint of the arm. When the target object is horizontally movable, the extrinsic parameter set of the calibration camera 131 can be calculated from the amount of horizontal movement of the target object.

The calibration-camera parameter storage unit 132 stores in advance at least the camera parameter set of the calibration camera 131, which has been subjected to camera calibration, and occlusion information. The occlusion information is information on a region in the camera image that is occluded by the calibration-image capturing unit 130. The camera parameter set of the calibration camera 131 may include an extrinsic parameter set and an intrinsic parameter set. The calibration-camera parameter storage unit 132 is implemented as a storage device, for example, a semiconductor memory such as a ROM, a RAM, or a flash memory, a hard disk drive, or an SSD.

The transceiver unit 133 transmits and receives information to and from the image processing unit 110. Examples of the information to be transmitted and received include the information described above with reference to the transceiver unit 114 of the image processing unit 110. The transceiver unit 133 may include a communication circuit and may be configured to transmit and receive the information to and from the image processing unit 110 via a communication device included in the target object on which the transceiver unit 133 is mounted. As described above, the transceiver unit 133 wirelessly communicates with the transceiver unit 114 of the image processing unit 110. However, the transceiver unit 133 may communicate with the transceiver unit 114 via wired communication or via a computer-readable recording medium.

The processing unit 134 controls the overall operation of the calibration-image capturing unit 130. For example, upon receipt of an instruction from the image processing unit 110 to perform camera calibration, the processing unit 134 causes the calibration camera 131 to capture an image. The processing unit 134 transmits the camera image captured by the calibration camera 131 and the camera parameter set of the calibration camera 131, which is stored in the calibration-camera parameter storage unit 132, to the image processing unit 110 via the transceiver unit 133. At this time, the processing unit 134 may authenticate communication by receiving identification information from the image processing unit 110 and may transmit the identification information about the calibration camera 131, which is stored in a semiconductor memory (not illustrated), to authenticate communication. The processing unit 134 may be implemented by hardware such as an electronic circuit or an integrated circuit or may be implemented by software such as a program executed on a computer.

Figure 5:
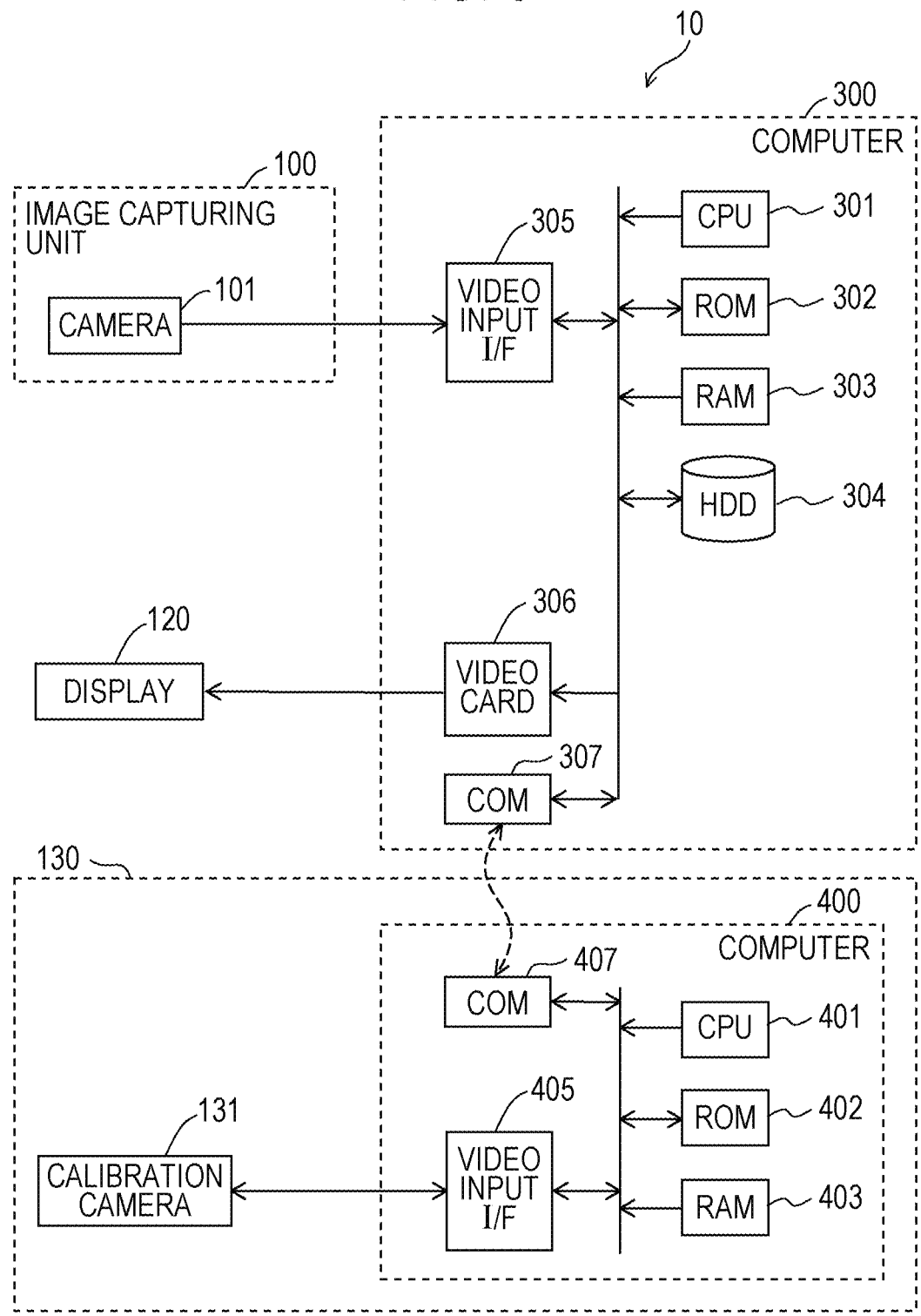
FIG. 5 is a block diagram of the camera system according to the embodiment, which is implemented by a computer.

For example, referring to FIG. 5, illustrated is an example hardware configuration of the camera system 10, which is implemented by a computer. The camera system 10 includes the camera 101 of the image capturing unit 100, a computer 300 corresponding to the image processing unit 110, the display 120, the calibration camera 131, and a computer 400 corresponding to the processing unit 134 of the calibration-image capturing unit 130. In the camera system 10, the camera 101 captures and outputs an image, and the computer 300 operates as the image processing unit 110 to generate and output an image. The display 120 displays the image generated by the computer 300. The calibration camera 131 captures and outputs an image, and the computer 400 operates as the processing unit 134 to output the image and the camera parameter set of the calibration camera 131. In this embodiment, the camera 101 and the calibration camera 131 are each constituted by a single camera.

The computer 300 includes a central processing unit (CPU) 301, a ROM 302, a RAM 303, a hard disk drive (HDD) 304, a video input interface (I/F) 305, a video card 306, and a communication unit (COM) 307. The computer 400 includes a CPU 401, a ROM 402, a RAM 403, a video input I/F 405, and a COM 407. Examples of the COMs 307 and 407 include a communication circuit.

A program for activating the computer 300 is held in the ROM 302 or the HDD 304 in advance. The program is read into the RAM 303 from the ROM 302 or the HDD 304 by the CPU 301, which is a processor, and is expanded. The CPU 301 executes each of the coded instructions in the program expanded in the RAM 303. The video input I/F 305 loads the image captured by the camera 101 into the RAM 303 in accordance with execution of the program. The video card 306 processes the generated image in accordance with execution of the program and outputs the processed image to the display 120, and the display 120 displays the image. The COM 307 wirelessly communicates with the COM 407 in accordance with execution of the program, acquires the image captured by the calibration camera 131 and the camera parameter set of the calibration camera 131, and loads them into the RAM 303. As described above, the computer 300 corresponds to the image processing unit 110. The camera parameter storage unit 112 corresponds to the ROM 302, the RAM 303, or the HDD 304. The transceiver unit 114 corresponds to the COM 307.

Likewise, a program for activating the computer 400 is held in the ROM 402 in advance. The program is read into the RAM 403 from the ROM 402 by the CPU 401 and is expanded. The CPU 401 executes each of the coded instructions in the program expanded in the RAM 403. The video input I/F 405 loads the image captured by the calibration camera 131 into the RAM 403 in accordance with execution of the program. The COM 407 wirelessly communicates with the COM 307 in accordance with execution of the program, and transmits the image captured by the calibration camera 131 and the camera parameter set of the calibration camera 131. As described above, the computer 400 corresponds to the processing unit 134. The calibration-camera parameter storage unit 132 corresponds to the ROM 402 or the RAM 403. The transceiver unit 133 corresponds to the COM 407.

The computer programs may not necessarily be stored in a semiconductor device, namely, the ROMs 302 and 402 or the HDD 304, but may be stored in a recording medium such as a CD-ROM. The computer programs may be transmitted via a wired or wireless network, broadcasting, or any other medium and may be loaded into the RAMs 303 and 403 of the computers 300 and 400.

2. Operation of Camera System

The operation of the camera system 10 will be described. Specifically, the image generation operation and the calibration operation of the camera system 10 will be described sequentially.

2-1. Image Generation Operation

Figure 6:
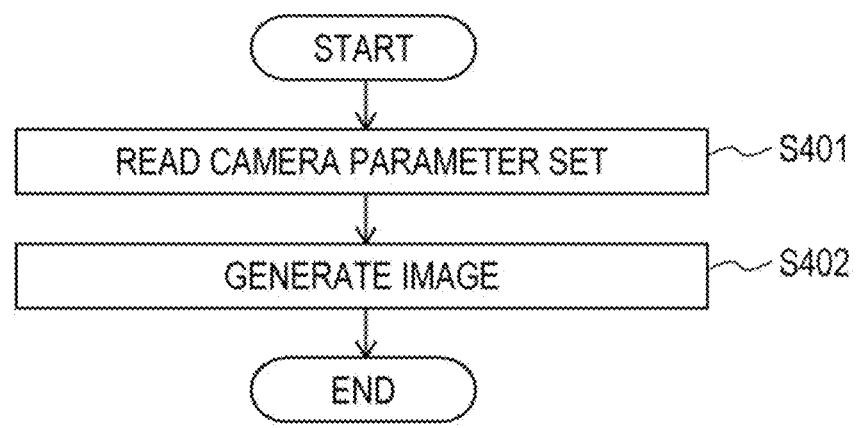
FIG. 6 is a flowchart illustrating an example of procedure of an image generation operation performed by an image processing unit according to the embodiment.

The image generation operation of the camera system 10 will be described with reference to FIG. 6. FIG. 6 is a flowchart illustrating an example of procedure of the image generation operation of the image processing unit 110 in the camera system 10. As illustrated in FIG. 6, the image generation operation includes the processing of step S401 for reading a camera parameter set and the processing of step S402 for generating an image. The processing operations illustrated in FIG. 6 may be executed by the computer 300 illustrated in FIG. 5.

As a non-limiting example, in this embodiment, the camera system 10 is installed in the motor vehicle 1. Specifically, the camera system 10 generates an image of the surroundings of the motor vehicle 1 by using a captured camera image of an area behind the motor vehicle 1, and displays the result on the display 120, which is installed in the motor vehicle 1. Thus, conditions around the motor vehicle 1 are presented to the user, namely, the driver.

Figure 7:
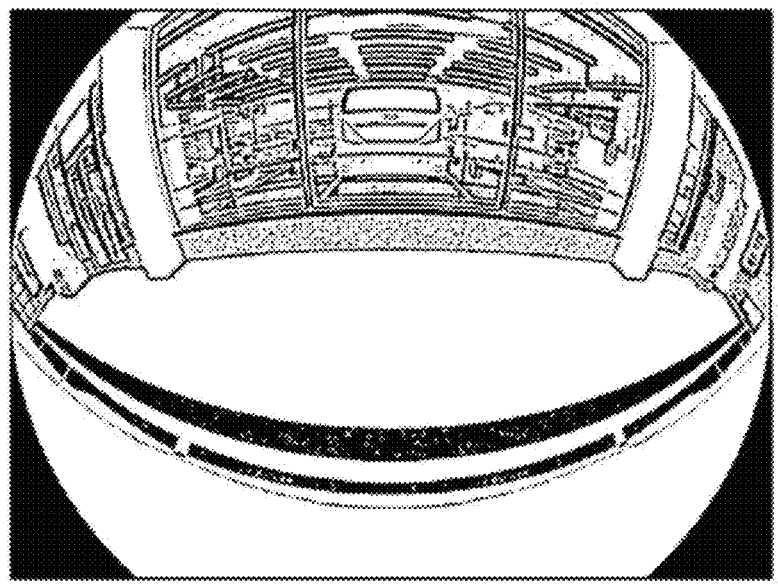
FIG. 7 is a schematic diagram illustrating an example of a captured image in the embodiment.

Referring to FIG. 7, illustrated is an example of an image captured by the camera 101 when the camera 101 is installed in the manner illustrated in FIG. 3. The camera 101 has a field of view of approximately 180 degrees.

The computer 300 executes a predetermined program in parallel with the operation of the image capturing unit 100 to perform the processing of steps S401 and S402 in FIG. 6. The following describes the processing of steps S401 and S402 executed by the computer 300 in more detail with reference to FIG. 2 and FIG. 6.

In step S401, the image generation unit 113 reads the camera parameter set of the camera 101 from the camera parameter storage unit 112. The camera parameter set is stored in the camera parameter storage unit 112 in advance and includes the intrinsic parameter set and extrinsic parameter set of the camera 101. The relationship between an extrinsic parameter set M of a camera and a three-dimensional coordinate set and the relationship among an intrinsic parameter set (f, dpx, dpy, cu, cv) of the camera, the three-dimensional coordinate set, and a pixel coordinate pair are given by equations (1) to (3).

$$\begin{pmatrix} x_e \\ y_e \\ z_e \\ 1 \end{pmatrix} = M \begin{pmatrix} x_w \\ y_w \\ z_w \\ 1 \end{pmatrix}, \tag{1}$$

$$M = \begin{pmatrix} r_{00} & r_{01} & r_{02} & t_x \\ r_{10} & r_{11} & r_{12} & t_y \\ r_{20} & r_{21} & r_{22} & t_z \\ 0 & 0 & 0 & 1 \end{pmatrix}$$

$$\begin{pmatrix} r_{00} & r_{01} & r_{02} \\ r_{10} & r_{11} & r_{12} \\ r_{20} & r_{21} & r_{22} \end{pmatrix} = \tag{2}$$

$$\begin{pmatrix} \cos Rz & -\sin Rz & 0 \\ \sin Rz & \cos Rz & 0 \\ 0 & 0 & 1 \end{pmatrix} \begin{pmatrix} \cos Ry & 0 & \sin Ry \\ 0 & 1 & 0 \\ -\sin Ry & 0 & \cos Ry \end{pmatrix} \begin{pmatrix} 1 & 0 & 0 \\ 0 & \cos Rx & -\sin Rx \\ 0 & \sin Rx & \cos Rx \end{pmatrix} =$$

$$\begin{pmatrix} \cos Ry \cos Rz & \begin{array}{l}-\cos Rx \sin Rz + \\ \sin Rx \sin Ry \cos Rz\end{array} & \begin{array}{l}\sin Rx \sin Rz + \\ \cos Rx \sin Ry \cos Rz\end{array} \\ \cos Ry \sin Rz & \begin{array}{l}\cos Rx \cos Rz + \\ \sin Rx \sin Ry \sin Rz\end{array} & \begin{array}{l}-\sin Rx \cos Rz + \\ \cos Rx \sin Ry \sin Rz\end{array} \\ -\sin Ry & \sin Rx \cos Ry & \cos Rx \cos Ry \end{pmatrix}$$

$$\left. \begin{array}{l} u = \dfrac{1}{dpx} f \dfrac{x_e}{z_e} + cu \\ v = \dfrac{1}{dpy} f \dfrac{y_e}{z_e} + cv \end{array} \right\} \tag{3}$$

In equation (1), the extrinsic parameter set M is an extrinsic parameter set representing a positional relationship between a world coordinate system and a camera coordinate system. The extrinsic parameter set M is expressed as a 4×4 matrix for converting a three-dimensional coordinate set $(x_w, y_w, z_w)$ in the world coordinate system into a three-dimensional coordinate set $(x_e, y_e, z_e)$ in the camera coordinate system. As given in equations (1) and (2), the extrinsic parameter set M represents the angles of rotation (Rx, Ry, Rz) about the Xw, Yw, and Zw axes of the world coordinate system and the amounts of translation (tx, ty, tz) along the Xw, Yw, and Zw axes of the world coordinate system. Equation (3) represents a relationship between the three-dimensional coordinate set $(x_e, y_e, z_e)$ of a certain point on a subject in the camera coordinate system and the pixel coordinate pair (u, v) of the same point appearing in a camera image. In the intrinsic parameter set, f denotes the focal distance of the camera, dpx and dpy denote the pixel sizes of an imaging element of the camera in the x and y directions, respectively, and (cu, cv) denote a pixel coordinate pair of an intersection of the $z_e$ axis of the camera coordinate system and the imaging plane of the camera. When a digital image is considered as a set of "values (i.e., pixel values) at two-dimensional lattice points (i.e., pixel coordinate pairs)", the position of each pixel in the image is expressed as a two-dimensional pixel coordinate pair.

The extrinsic parameter set M and the intrinsic parameter set (f, dpx, dpy, cu, cv) are determined in advance by using the camera calibration method of the related art described above. The constraints in equations (1) to (3) are not sufficient for the calculation of the parameters dpx, dpy, and f. Thus, one of the parameters dpx, dpy, and f may be calculated by using a design value, and the two remaining parameters may be calculated in accordance with the camera calibration method of the related art.

In equation (3), a perspective projection model (also referred to as a pinhole camera model) is used as a projection model of the lens, which is not intended to limit the projection model. Any other projection model such as an equidistant projection model, a stereographic projection model, or an equisolid angle projection model may be used. For example, when an equidistant projection model is used, an intrinsic parameter set given by equation (4) below is used instead of the intrinsic parameter set given by equation (3).

$$\left.\begin{aligned} u &= \frac{1}{dpx} \frac{x_e}{\sqrt{x_e^2 + y_e^2}} f\theta + cu \\ v &= \frac{1}{dpy} \frac{y_e}{\sqrt{x_e^2 + y_e^2}} f\theta + cv \\ \theta &= \tan^{-1}\left(\frac{\sqrt{x_e^2 + y_e^2}}{z_e}\right) \end{aligned}\right\} \quad (4)$$

With respect to extrinsic parameter sets, for example, two cameras are represented as cameras i and j. In this case, extrinsic parameter sets $M_i$ and $M_j$ representing positional relationships of the cameras i and j can be given by equation (5) as follows.

$$\begin{pmatrix} x_j \\ y_j \\ z_j \\ 1 \end{pmatrix} = M_j M_i^{-1} \begin{pmatrix} x_i \\ y_i \\ z_i \\ 1 \end{pmatrix} = M_{i,j} \begin{pmatrix} x_i \\ y_i \\ z_i \\ 1 \end{pmatrix} \quad (5)$$

Furthermore, for example, a camera parameter set including the intrinsic parameter set and extrinsic parameter set of the camera 101 is denoted by $C_a$, as given by equation (6) as follows.

$$C_a = (f_a, dpx_a, dpy_a, cu_a, cv_a, M_a) \quad (6)$$

Figure 8:
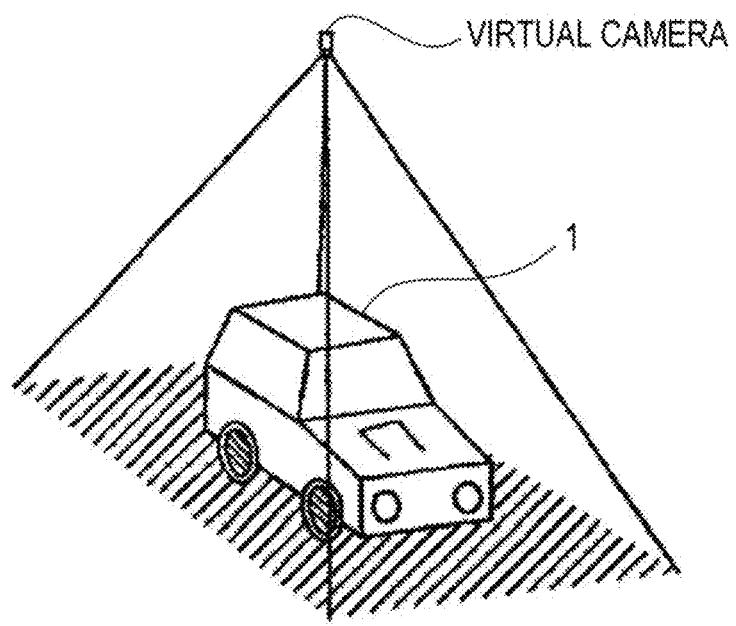
FIG. 8 is a schematic diagram illustrating an example arrangement of a virtual camera in the embodiment.

In step S402, the image generation unit 113 acquires a camera image $I_a$ captured by the camera 101 and the camera parameter set $C_a$ of the camera 101. Further, the image generation unit 113 maps the camera image $I_a$ to a predetermined spatial model. In this embodiment, the predetermined spatial model is assumed to be implemented as a two-dimensional model with $z_w=0$. Further, the image generation unit 113 generates, as an image viewed from a predetermined virtual camera, a spatial model onto which the camera image is projected, by using a camera parameter set Co of the virtual camera. In this embodiment, as illustrated in FIG. 8, a virtual camera located above the motor vehicle 1 looking down at the surroundings of the motor vehicle 1 is applied as the predetermined virtual camera. FIG. 8 is a schematic diagram illustrating an example arrangement of a virtual camera in the embodiment. A technique for generating an image from a camera image captured by a camera by using a spatial model is described in detail in, for example, Japanese Patent No. 3286306 and is well known, which will not be described in further detail herein.

As described above, through the processing of steps S401 and S402 for image generation executed by the computer 300, the image processing unit 110 generates an image at a viewpoint of a virtual camera from the camera image captured by the image capturing unit 100 and outputs the generated image. The image capturing unit 100 and the computer 300 may repeatedly perform the process described above.

Figure 9:
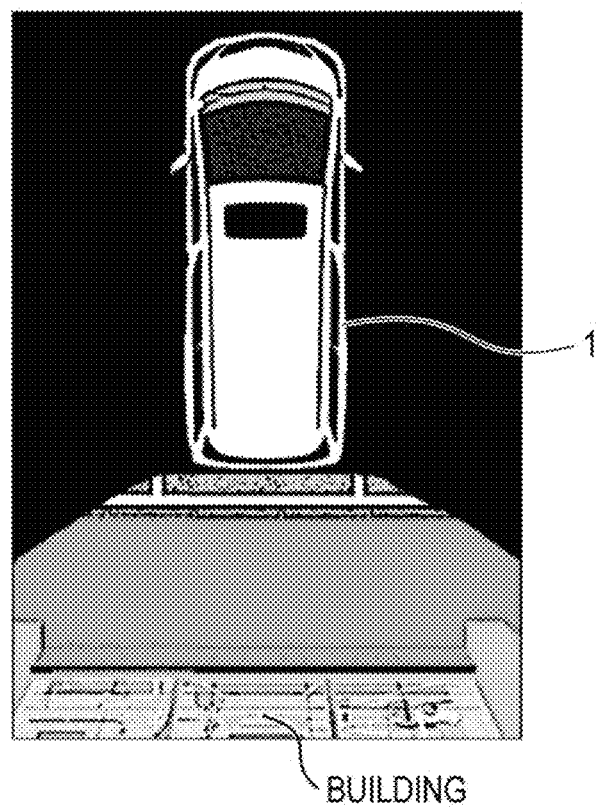
FIG. 9 is a schematic diagram illustrating an example of a generated image in the embodiment.

FIG. 9 illustrates an example of an image generated as a result of the processing of step S402. Referring to FIG. 9, obstacles around the motor vehicle 1 can be easily recognized by the driver. For example, in the example in FIG. 9, the direction of a building behind the motor vehicle 1 and the distance of the obstacle from the motor vehicle 1 can be easily recognized by the driver.

As described above, as a result of the operations described above, the image capturing unit 100 of the camera system 10 and the image processing unit 110 implemented by the computer 300 can generate and display an image of the surroundings of the vehicle body from a viewpoint of a virtual camera by using the camera image captured by the camera 101 arranged on the vehicle body. The driver of the motor vehicle 1 including the camera system 10 can thus readily identify a three-dimensional object such as an obstacle around the motor vehicle 1.

2-2. Calibration Operation

The camera system 10 described above generates an image by using pre-recorded camera parameter sets. When a camera is manufactured and when a camera is installed in a motor vehicle, a camera parameter set needs to be estimated, that is, camera calibration is necessary, since the camera parameter set has differences from design values which are caused by an assembly error. Even though a camera is calibrated when assembled, the attached position of the camera may change due to deformation or the like caused by factors such as changes over time, external force, or temperature changes. For example, when the attached position of a camera changes over time, an image generated by using a camera parameter set obtained before the attached position of the camera changes over time is not accurate because, for example, a position shift of a subject occurs between the generated image and an image generated by using a camera parameter set that would be obtained after the attached position of the camera changes over time. Thus, camera calibration is also necessary to address changes in camera parameter due to changes over time or other factors.

Figure 10:
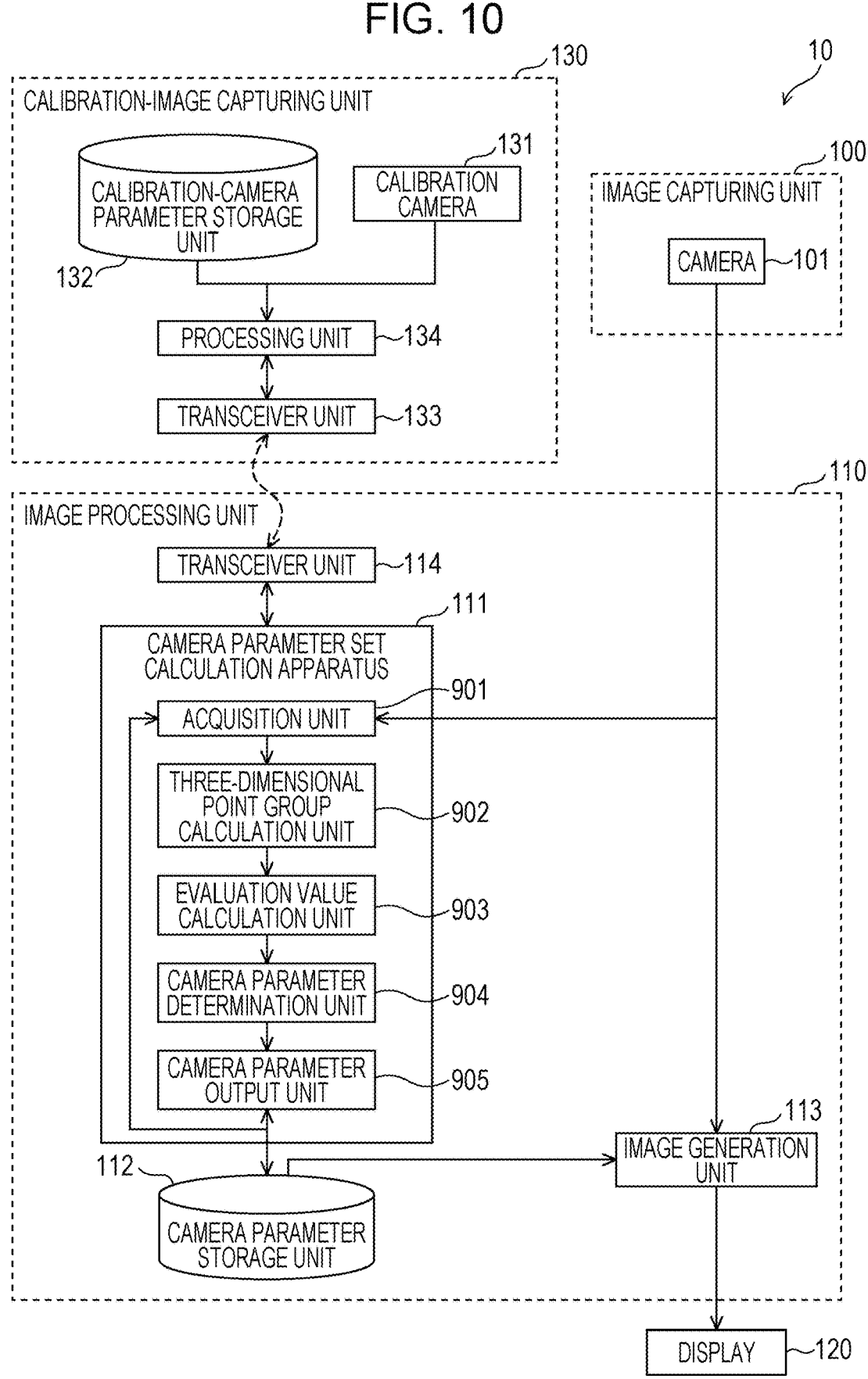
FIG. 10 is a schematic diagram illustrating the functional configuration of a camera parameter set calculation apparatus according to the embodiment.
Figure 11:
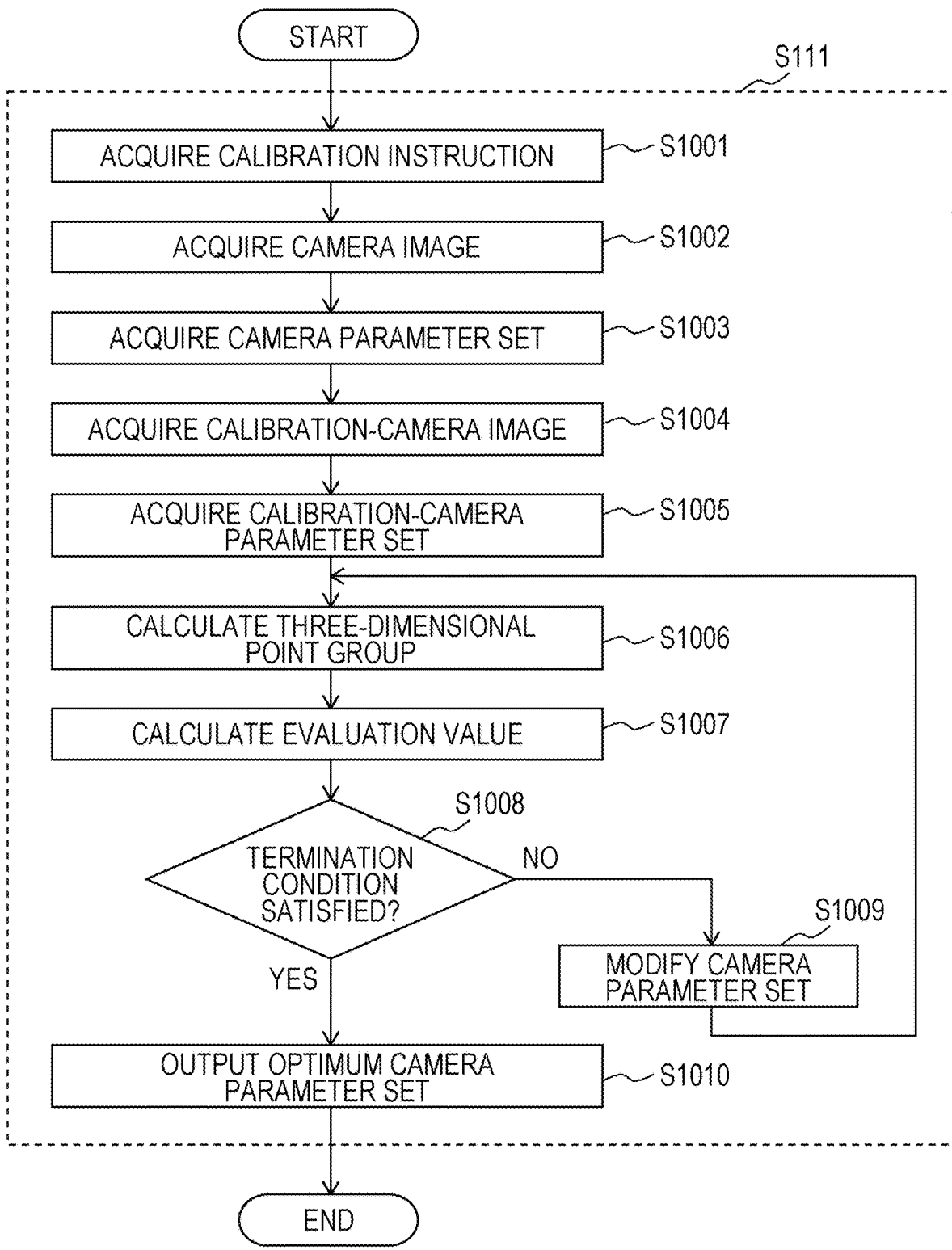
FIG. 11 is a flowchart illustrating an example of procedure of a calibration operation performed by the image processing unit according to the embodiment.

The following describes the calibration operation of the camera system 10 with reference to FIG. 10 and FIG. 11. FIG. 10 is a functional configuration diagram illustrating the detailed configuration of the camera parameter set calculation apparatus 111 in the camera system 10 illustrated in FIG. 2. FIG. 11 is a flowchart illustrating an example of procedure of a calibration process S111 performed by the image processing unit 110 in the camera system 10 according to the embodiment. The calibration process S111 is a process performed by the image processing unit 110 and the calibration-image capturing unit 130 in the calibration operation and is executed by the computers 300 and 400 illustrated in FIG. 5.

The configuration of the camera parameter set calculation apparatus 111, which performs the calibration process S111, will now be described. As illustrated in FIG. 10, the camera parameter set calculation apparatus 111 includes an acquisition unit 901, a three-dimensional point group calculation unit 902, an evaluation value calculation unit 903, a camera parameter determination unit 904, and a camera parameter output unit 905. The constituent elements implemented as the acquisition unit 901, the three-dimensional point group calculation unit 902, the evaluation value calculation unit 903, the camera parameter determination unit 904, and the camera parameter output unit 905 may have configurations similar to those of a constituent element such as the image generation unit 113 of the image processing unit 110.

The acquisition unit 901 acquires a camera image $I_a$ captured by the camera 101 from the image capturing unit 100. The acquisition unit 901 may acquire the camera image $I_a$, which is stored in a storage device such as a semiconductor memory (not illustrated) included in the image capturing unit 100, the image processing unit 110, or the like. The acquisition unit 901 further acquires an initial camera parameter set, which includes camera parameters currently set in the camera 101, from the camera parameter storage unit 112.

The acquisition unit 901 further acquires an instruction input by the user of the camera system 10, such as the driver of the motor vehicle 1, via an input device to start camera calibration of the camera 101, that is, a calibration instruction. Then, in accordance with the calibration instruction, the acquisition unit 901 sends a request to the processing unit 134 of the calibration-image capturing unit 130 via the transceiver unit 114 to capture a camera image (referred to as a camera image $I_b$) by using the calibration camera 131 and transmit the captured image and to transmit the camera parameter set of the calibration camera 131. Accordingly, the acquisition unit 901 acquires the camera image $I_b$ captured by the calibration camera 131 from the calibration-image capturing unit 130 via the transceiver unit 114. Further, the acquisition unit 901 acquires the camera parameter set of the calibration camera 131 after camera calibration, which is stored in the calibration-camera parameter storage unit 132, from the calibration-image capturing unit 130 via the transceiver unit 114.

The three-dimensional point group calculation unit 902 estimates and extracts a pair of corresponding points in two camera images captured by two cameras and calculates pixel coordinate pairs of the corresponding points in the two camera images. The pair of corresponding points is a pair of points each of which is included in one of the two camera images and the points correspond to each other. When two cameras image the same subject to obtain the two camera images, that is, when one of the cameras images a point on the subject and the other camera images the point, these two imaged points are referred to as corresponding points. The estimation of a pair of corresponding points specifically indicates the calculation of the pixel coordinate pairs of the corresponding points.

Further, the three-dimensional point group calculation unit 902 calculates a three-dimensional coordinate set of a point on the subject corresponding to the pair of corresponding points by using a stereoscopic distance measurement technique on the basis of the pixel coordinate pairs of the corresponding points and the initial camera parameter sets of the two cameras. The stereoscopic distance measurement technique is also called stereoscopy. In the stereoscopic distance measurement technique, camera images are acquired by using two camera positioned to capture images from different viewpoints and arranged to have overlapping fields of view, and a pair of points each of which is included in one of the two camera images and which correspond to each other, that is, a pair of corresponding points, is estimated. Furthermore, a three-dimensional coordinate set of a point on the subject corresponding to the pair of corresponding points is computed by using the two corresponding points included in the pair of corresponding points and by using predetermined information of the cameras, such as the positions and orientations of the cameras. In the following description, a point corresponding to a three-dimensional coordinate set calculated by the three-dimensional point group calculation unit 902 is also referred to as a distance measurement point.

The evaluation value calculation unit 903 calculates evaluation values of camera parameter sets on the basis of the pixel values of points obtained by projecting the three-dimensional coordinate set of the distance measurement point onto the two camera images used to estimate the pair of corresponding points. In the following description, points in two camera images which are obtained by projecting a distance measurement point onto the two camera images are referred to as projected points. A projected point obtained by projecting a distance measurement point, which is based on a camera image $I_S$ obtained by capturing an image of a subject by using a camera S and a camera image $I_T$ obtained by capturing an image of the subject by using a camera T, onto the camera image $I_S$ may be referred to as a first projected point, and a projected point obtained by projecting the same distance measurement point onto the camera image $I_T$ may be referred to as a second projected point.

The camera parameter determination unit 904 determines whether to modify the camera parameter set currently set in the camera 101 on the basis of the evaluation value calculated by the evaluation value calculation unit 903. In accordance with a determination result, the camera parameter determination unit 904 modifies, or updates, the camera parameter set. The camera parameter determination unit 904 determines the camera parameter set in this way. The camera parameter output unit 905 acquires the camera parameter set determined by the camera parameter determination unit 904 and outputs the acquired camera parameter set to the camera parameter storage unit 112 and so on.

As illustrated in FIG. 11, the camera parameter set calculation apparatus 111 performs the calibration process S111 including steps S1001 to S1010 to calibrate a set of camera parameters that are set in the camera 101, that is, an initial camera parameter set. In the calibration process S111, the camera parameter set calculation apparatus 111 receives external input including a calibration instruction, thereby starting the calibration process. Specifically, when the user inputs a calibration instruction to the camera system 10 via an input device (not illustrated) such as a switch, a touch pad, or a keyboard, the camera parameter set calculation apparatus 111 starts a calibration process of the camera 101. For example, the user may input a calibration instruction upon discovery of malfunctioning of the camera 101.

The following describes the operation of calibrating the camera parameter set $C_a$ of the camera 101 by using the camera parameter set calculation apparatus 111 when the user intends to calibrate the camera parameter set $C_a$. For example, FIG. 3 illustrates the motor vehicle 1, which is set at a predetermined position relative to the calibration camera 131 to calibrate the camera parameter set of the camera 101 mounted in the rear portion 1a of the motor vehicle 1. The user moves the motor vehicle 1 to a facility or the like including the calibration camera 131 and parks the motor vehicle 1 in a predetermined position and orientation relative to the calibration camera 131 in order to calibrate the camera parameter set of the camera 101. For example, as illustrated in FIG. 3, the user parks the motor vehicle 1 in markings 3, which are a position indicator on the ground in the vicinity of the calibration camera 131, thereby parking the motor vehicle 1 in a predetermined position and orientation.

Figure 12A:
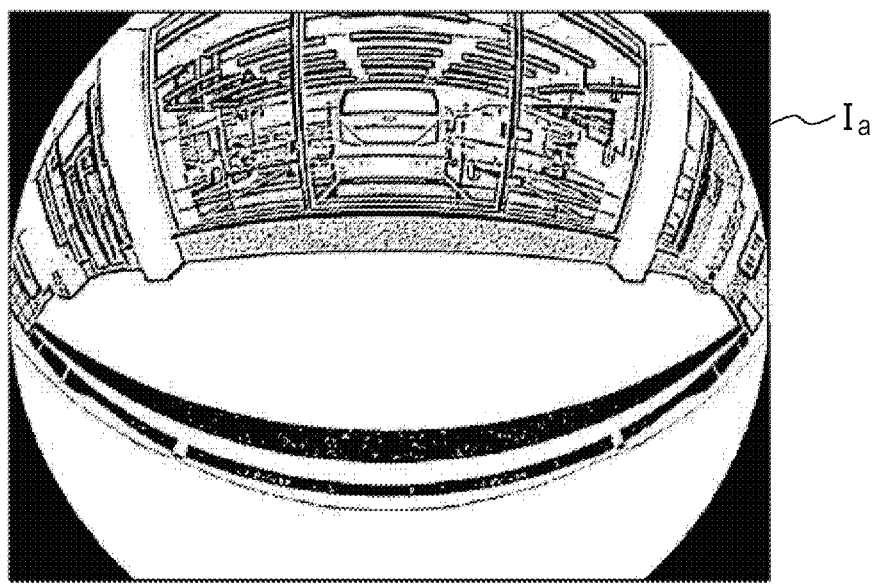
FIG. 12A is a schematic diagram illustrating an example of a camera image obtained by a camera illustrated in FIG. 3.
Figure 12B:
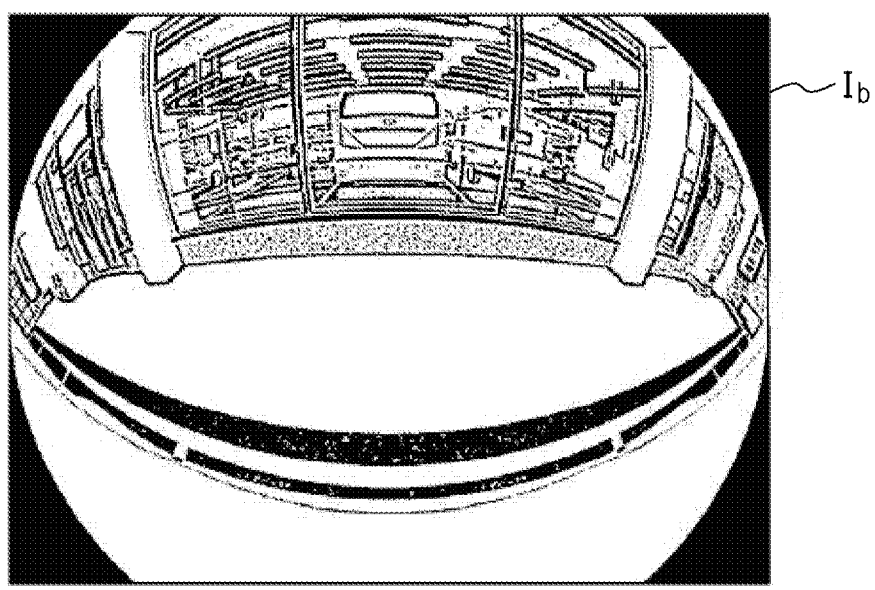
FIG. 12B is a schematic diagram illustrating an example of a camera image obtained by a calibration camera illustrated in FIG. 3.

As described above, parking the motor vehicle 1 in a predetermined position and orientation allows the camera 101 to be oriented in a direction similar to that of the calibration camera 131 and allows an overlapping region to occur between the field of view of the camera 101 and the field of view of the calibration camera 131. In the example illustrated in FIG. 3, the camera 101 and the calibration camera 131 capture images of an area behind the motor vehicle 1. The predetermined position and orientation are set so that the field of view of the camera 101 and the field of view of the calibration camera 131 have an overlap when the motor vehicle 1 is parked. That is, the position and orientation of the camera 101 are set to allow the field of view of the camera 101 and the field of view of the calibration camera 131 to have an overlap during the calibration of the camera parameter set of the camera 101. For example, FIG. 12A and FIG. 12B illustrate an example of the camera images $I_a$ and $I_b$ captured by the camera 101 and the calibration camera 131, respectively, when the camera 101 and the calibration camera 131 are installed in the manner illustrated in FIG. 3. The camera image $I_a$ includes an image of a subject imaged by the camera 101 and the camera image $I_b$ includes an image of the subject imaged by the calibration camera 131. In the following, regions where images of the same subject appears on the camera images $I_a$ and $I_b$ is referred to as overlapping imaging regions.

Note that the imaging area of the calibration camera 131 may include the imaging area of the camera 101 in as large a proportion as possible. In other words, the overlapping imaging regions included in images captured by the calibration camera 131 and the camera 101 may be as large a proportion as possible. The larger the overlapping imaging region of the camera 101 is, the smaller the error of each camera parameter of the camera 101 obtained as a result of calibration is, expectedly resulting in an increase in the calibration accuracy of the camera 101.

Accordingly, when the camera 101 is arranged in a location other than the rear portion 1a of the motor vehicle 1, the motor vehicle 1 is parked in a predetermined position and orientation relative to the calibration camera 131 so that an overlapping region occurs between the field of view of the camera 101 and the field of view of the calibration camera 131 during camera calibration. For example, the camera parameter set of the camera 101 arranged in the left side portion 1c of the motor vehicle 1 is calibrated. In this case, as illustrated in FIG. 4, the motor vehicle 1 is parked in accordance with a position indicator so that an overlapping region occurs between the field of view of the camera 101 and the field of view of the calibration camera 131. FIG. 4 illustrates an example situation of the motor vehicle 1 including cameras 101 in the front portion 1b, the rear portion 1a, the left side portion 1c, and the right side portion 1d, for calibrating the camera parameter set of the camera 101 in the left side portion 1c. In the example illustrated in FIG. 4, also for the calibration of the camera parameters of the cameras 101 in the front portion 1b and the right side portion 1d, the motor vehicle 1 is parked in accordance with a position indicator so that overlapping regions occur between the fields of view of the cameras 101 and the field of view of the calibration camera 131.

The markings 3, which are an example of the position indicator, may be those illustrated in FIG. 3, which indicate the overall position and orientation of the motor vehicle 1, such as a frame surrounding the motor vehicle 1. Alternatively, the markings 3 may be those illustrated in FIG. 4, which partially indicate the position and orientation of the motor vehicle 1, such as markings at positions corresponding to those of the wheels of the motor vehicle 1 or markings at positions corresponding to those of the corners of the motor vehicle 1. The position indicator is not limited to markings on the ground but may be an object such as a vertically extending pole or a horizontally extending bar. The method of parking the motor vehicle 1 in a predetermined position and orientation is not limited to a method based on a position indicator, and may be a method based on the position of the motor vehicle 1, which is measured using a Global Positioning System (GPS) based car navigation device mounted on the motor vehicle 1. Alternatively, the motor vehicle 1 may be parked in a predetermined position and orientation on the basis of the position of the motor vehicle 1, which is detected from the measurement results of objects in the surroundings by millimeter wave radar, laser radar, or the like mounted on the motor vehicle 1.

In step S1001, when finishing parking the motor vehicle 1 in a predetermined position and orientation, the user inputs a calibration instruction to the camera system 10. Upon acquisition of the calibration instruction, the acquisition unit 901 of the camera parameter set calculation apparatus 111 starts the calibration process S111.

Then, in step S1002, the acquisition unit 901 acquires the camera image $I_a$ captured by the camera 101 after acquiring the calibration instruction. If the camera 101 has not yet captured an image, the acquisition unit 901 may request the camera 101 to capture an image and acquire the camera image $I_a$ captured thereafter.

Further, in step S1003, the acquisition unit 901 reads an initial camera parameter set $C_{a0}$ of the camera 101, which is stored in the camera parameter storage unit 112 in advance. The term "in advance" may refer to "before the camera parameter set calculation apparatus 111 starts the calibration process".

In step S1004, the acquisition unit 901 requests the calibration-image capturing unit 130 to capture an image and acquires the camera image $I_b$ captured by the calibration camera 131 thereafter. The camera image $I_b$ is also referred to as a calibration camera image. The acquisition unit 901 may acquire the camera image $I_b$ captured in advance by the calibration camera 131 if the camera images $I_a$ and $I_b$ include overlapping imaging regions.

Further, in step S1005, the acquisition unit 901 sends a request for a camera parameter set $C_b$ of the calibration camera 131, which is stored in advance in the calibration-camera parameter storage unit 132, to the calibration-image capturing unit 130. Then, the acquisition unit 901 acquires the camera parameter set $C_b$ transmitted from the calibration-image capturing unit 130. The camera parameter set $C_b$ is a camera parameter set that has already been calculated by performing camera calibration on the calibration camera 131 and that is equal to the true values thereof or is nearly equal to the true values. The camera parameter set $C_b$ is also referred to as a calibration-camera parameter set. The acquisition unit 901 may perform any one of the processing of step S1002 and the processing of step S1004 first or may perform the processing of step S1002 and the processing of step S1004 in parallel.

In step S1006, the three-dimensional point group calculation unit 902 uses the acquired camera image $I_a$ of the camera 101 and the acquired camera image $I_b$ of the calibration camera 131 to estimate and extract N pairs of corresponding points in the two camera images $I_a$ and $I_b$. The three-dimensional point group calculation unit 902 calculates and outputs coordinate pairs of two corresponding points included in each pair of corresponding points, that is, a pixel coordinate pair $(u_{an}, v_{an})$ of the corresponding point in the camera image $I_a$ and a pixel coordinate pair $(u_{bn}, v_{bn})$ of the corresponding point in the camera image $I_b$, where n takes a value from 1 to N. The three-dimensional point group calculation unit 902 further calculates and outputs three-dimensional coordinate sets $(x_{ar1}, y_{ar1}, z_{ar1})$ to $(x_{arn}, y_{arn}, z_{arn})$ of N points on the subject, N distance measurement points, corresponding to the N pairs of corresponding points in accordance with the stereoscopic distance measurement technique by using two pixel coordinate pairs included in each of the N pairs of corresponding points in the camera images $I_a$ and $I_b$ and by using the respective camera parameter sets $C_a$ and $C_b$ of the camera 101 and the calibration camera 131. That is, the three-dimensional point group calculation unit 902 calculates three-dimensional coordinate sets of the N distance measurement points.

The processing of steps S1006 to S1009 is repeatedly performed in accordance with the determination result of step S1008. Each time the processing of steps S1006 to S1009 is repeated, the camera parameter set of the camera 101 is updated. The camera parameter set of the camera 101 at the r-th iteration of the processing is represented as a camera parameter set $C_{ar}$. When camera parameter set $C_{ar}$ is the initial camera parameter set, r=0 holds.

The details of the processing of step S1006 will now be described. A camera image obtained by the camera 101 capturing an image of a subject is represented as the camera image $I_a$ and a camera image obtained by the calibration camera 131 capturing an image of the subject is represented as the camera image $I_b$. The three-dimensional point group calculation unit 902 estimates and calculates a pixel coordinate pair $(u_{an}, v_{an})$ of an image of a point Pn on the subject and a pixel coordinate pair $(u_{bn}, v_{bn})$ of an image of the point Pn on the subject, on the basis of, for example, the similarity of the images, the brightness constraint and the smoothness constraint described below, and so on. The camera image $I_a$ includes the image of the point Pn at the pixel coordinate pair $(u_{an}, v_{an})$ and the camera image $I_b$ includes the image of the point Pn at the pixel coordinate pair $(u_{bn}, v_{bn})$. When a point $P_{an}$ included in the camera image $I_a$ and a point $P_{bn}$ included in the camera image $I_b$ correspond to each other, the pair of corresponding points $(P_{an}, P_{bn})$ may be expressed as a pair of pixel coordinate pairs $\{(u_{an}, v_{an}), (u_{bn}, v_{bn})\}$ corresponding to the pair of corresponding points $(P_{an}, P_{bn})$. The pixel coordinate pair at the point $P_{an}$ is $(u_{an}, v_{an})$ and the pixel coordinate pair at the point $P_{bn}$ $(u_{bn}, v_{bn})$. In the example of the camera images illustrated in FIG. 12A and FIG. 12B, pixel coordinate pairs $(u_{an}, v_{an})$ and $(u_{bn}, v_{bn})$ of the corresponding points in the two camera images $I_a$ and $I_b$ would be obtained within the overlapping imaging regions on the two camera images $I_a$ and $I_b$.

When the pixel coordinate pair $(u_{an}, v_{an})$ on the camera image $I_a$ and the pixel coordinate pair $(u_{bn}, v_{bn})$ on the camera image $I_b$ are pixel coordinate pairs of two corresponding points included in a pair of corresponding points, pixel values $I_a(u_{an}, v_{an})$ and $I_b(u_{bn}, v_{bn})$ at the two corresponding points, that is, at the two pixel coordinate pairs, are equal. This is called the brightness constraint. Further, since a certain subject occupies adjacent pixels on a camera image, points included in the camera image $I_b$ corresponding to points identified with pixels adjacent to a point identified with the pixel coordinate pair $(u_{an}, v_{an})$ on the camera image $I_a$ are likely to be located near a point identified with the pixel coordinate pair $(u_{bn}, v_{bn})$ on the camera image $I_b$. This is called the smoothness constraint. Pairs of corresponding points in the camera images $I_a$ and $I_b$ (pairs of corresponding pixel coordinate pairs on the camera images $I_a$ and $I_b$) can be obtained by estimating a collection of pairs of pixel coordinate pairs $(u_{an}, v_{an})$ and $(u_{bn}, v_{bn})$ that most satisfy the two conditions described above, namely, the brightness constraint and the smoothness constraint.

A corresponding points search method and a motion estimation method for estimating two pixel coordinate pairs at a pair of corresponding points in two camera images with the precision of a real number are well known and are described in detail in, for example, C. Zach, T. Pock, and H. Bischof, "A Duality Based Approach for Realtime TV-L$^1$ Optical Flow", in Proceedings of the 29th DAGM conference on Pattern recognition, 2007, p. 214-223, which will not be described in detail herein.

The three-dimensional point group calculation unit 902 further calculates a three-dimensional coordinate set $(x_{arn}, y_{arn}, z_{arn})$ of a point (distance measurement point) on the subject corresponding to the estimated pair of corresponding points in accordance with equation (3) above by using the pixel coordinate pairs $(u_{an}, v_{an})$ and $(u_{bn}, v_{bn})$ of the two corresponding points included in the pair of corresponding points and by using the respective camera parameter sets $C_{ar}$ and $C_b$ of the camera 101 and the calibration camera 131. The three-dimensional coordinate sets are each assumed to be a set of coordinate values in the camera coordinate system of the camera 101. A binocular stereo method for calculating a three-dimensional coordinate set of a point (distance measurement point) on the subject corresponding to a pair of corresponding points in two camera images on the basis of the coordinate pairs of the two corresponding points included in the pair of corresponding points and on the basis of two camera positions, and transformation of coordinate values between two three-dimensional coordinate systems are well known and are described in detail in, for example, Takashi MATSUYAMA et al., eds. "Computer Vision", Shin-Gijutsu Communications, p. 123-137, which will not be described in detail herein.

For simplicity of the following description, a process for calculating a three-dimensional coordinate set $(x_{arn}, y_{arn}, z_{arn})$ of a point (distance measurement point) on the subject corresponding to a pair of corresponding points in accordance with equation (3) above by using coordinate pairs $(u_{an}, v_{an})$ and $(u_{bn}, v_{bn})$ of the two corresponding points included in the pair of corresponding points and by using the respective camera parameter sets $C_{ar}$ and $C_b$ of the camera 101 and the calibration camera 131 is represented by equation (7) below using a function F. The pair of corresponding points has one point included in a camera image obtained by the camera 101 capturing an image of the subject and the other point included in a camera image obtained by the calibration camera 131 capturing an image of the subject. Through the processing of step S1006 described above, the three-dimensional point group calculation unit 902 calculates N three-dimensional coordinate sets of points (N points) on the subject corresponding to pairs (N pairs) of corresponding points in the two camera images. The points (N points) are distance measurement points (N distance measurement points).

$(x_{arn}, y_{arn}, z_{arn}) = F(u_{an}, v_{an}, u_{bn}, v_{bn}, C_{ar}, C_b)$ $r = 0 \ldots R, n = 1 \ldots N$ \hfill (7)

Further, in step S1007, the evaluation value calculation unit 903 projects each of the N distance measurement points onto the respective camera images $I_a$ and $I_b$ of the camera 101 and the calibration camera 131 by using the three-dimensional coordinate sets of the N distance measurement points and the respective camera parameter sets $C_{ar}$ and $C_b$ of the camera 101 and the calibration camera 131. Then, the evaluation value calculation unit 903 calculates, for each distance measurement point, a first projected point in the camera image $I_a$ and a second projected point in the camera image $I_b$, each of the first projected point and the second projected point being obtained by projecting the distance measurement point. The phrase "projecting each distance measurement point onto camera images" refers to performing, by the evaluation value calculation unit 903, coordinate transformation from a three-dimensional coordinate set of each distance measurement point to a pixel coordinate pair on the camera images $I_a$ and $I_b$ in accordance with equations (8) and (9) below. Accordingly, the evaluation value calculation unit 903 calculates, for each distance measurement point, a pixel coordinate pair $(u_{arn}, y_{arn})$ of the first projected point in the camera image $I_a$ and a pixel coordinate pair $(u_{brn}, v_{brn})$ of the second projected point in the camera image $I_b$. In equation (8), the function G represents coordinate transformation based on equations (1) to (3) and (5) above from the three-dimensional coordinate set of the distance measurement point to the pixel coordinate pair on the camera image $I_a$. In equation (9), the function H represents coordinate transformation based on equations (1) to (3) and (5) above from the three-dimensional coordinate set of the distance measurement point to the pixel coordinate pair on the camera image $I_b$.

$(u_{arn}, y_{arn}) = G(x_{arn}, y_{arn}, z_{arn}, C_{ar})$ $r = 0 \ldots R, n = 1 \ldots N$ \hfill (8)

$(u_{brn}, v_{brn}) = H(x_{arn}, y_{arn}, z_{arn}, C_{ar}, C_b)$ $r = 0 \ldots R, n = 1 \ldots N$ \hfill (9)

Further, the evaluation value calculation unit 903 calculates a pixel value iar of the first projected point, which is obtained by projecting each distance measurement point onto the camera image $I_a$, and a pixel value ibr of the second projected point, which is obtained by projecting the same distance measurement point onto the camera image $I_b$, by using the camera images $I_a$ and $I_b$ and the camera parameter sets $C_{ar}$ and $C_b$. For example, the pixel coordinate pair of the first projected point is represented as $(u_{arn}, y_{arn})$ and the pixel coordinate pair of the second projected point is represented as $(u_{brn}, v_{brn})$. In this case, the pixel value iar of the first projected point is expressed as $I_a(u_{arn}, v_{arn})$, and the pixel value ibr of the second projected point is expressed as $I_b(u_{brn}, v_{brn})$. The evaluation value calculation unit 903 calculates pixel values of first projected points and pixel values of second projected points for the distance measurement points. The pixel values of first projected points and the distance measurement points are in a one-to-one relationship. The pixel values of second projected points and the distance measurement points are in a one-to-one relationship. Then, the evaluation value calculation unit 903 calculates an evaluation value J, which is defined by the total sum of the absolute values of the differences on the basis of an evaluation function given in equation (10) below. Each of the differences is provided between the pixel value iar of the first projected point and the pixel value ibr of the second projected point.

$$J = \frac{1}{N} \sum_{n=1}^{N} |I_a(u_{am}, v_{am}) - I_b(u_{bm}, v_{bm})| \quad (10)$$

In equation (10), N denotes the number of distance measurement points and corresponds to all of the points identified with the three-dimensional coordinate set $(x_{arn}, y_{arn}, z_{arn})$ calculated in step S1006. The pixel coordinate pairs $(u_{arn}, y_{arn})$ and $(u_{brn}, v_{brn})$ are the pixel coordinate pairs of the n-th projected point, corresponding to the n-th distance measurement point, onto the camera image $I_a$ of the camera 101 and the camera image $I_b$ of the calibration camera 131, respectively. The pixel coordinate pair $(u_{arn}, y_{arn})$ is calculated by using the three-dimensional coordinate set $(x_{arn}, y_{arn}, z_{arn})$ and the camera parameter set $C_{ar}$ of the camera 101. The pixel coordinate pair $(u_{brn}, v_{brn})$ is calculated by using the three-dimensional coordinate set $(x_{arn}, y_{arn}, z_{arn})$ and the camera parameter set $C_b$ of the calibration camera 131 in accordance with equation (3) above. The pixel value $I_a(u_{arn}, v_{arn})$ is a pixel value at the pixel coordinate pair $(u_{arn}, y_{arn})$ on the camera image $I_a$, and the pixel value $I_b(u_{brn}, v_{brn})$ is a pixel value at the pixel coordinate pair $(u_{brn}, v_{brn})$ on the camera image $I_b$, where brightness values are used here.

In this embodiment, furthermore, each pixel value is a brightness value of a pixel. Each pixel value is calculated by using bicubic interpolation for a pixel coordinate pair having the precision of real numbers. Each pixel value is not limited to a brightness value and may be implemented as a red-green-blue (RGB) value instead of a brightness value. In addition, the method for calculating a pixel value for a pixel coordinate pair having the precision of real numbers is not limited to bicubic interpolation and may be based on any other interpolation method such as bilinear interpolation. Furthermore, during the computation of the evaluation value J, the sum of the absolute values of the differences between the pixel values of the first projected points and the pixel values of the second projected points for the N distance measurement points may be calculated by weighting the absolute values of the differences between the pixel values. For example, a greater weight may be applied to a group of points at which the color of the subject changes continuously, or a smaller weight may be applied to a group of points at which the surface irregularities of the subject are large. Such weighting can be expected to have the advantage of making the change in the evaluation value J smooth against continuous changes in camera parameters and facilitating minimization of the evaluation value J.

Then, in step S1008, the camera parameter determination unit 904 determines whether a termination condition for terminating the process for updating the camera parameter set $C_{ar}$ of the camera 101 is satisfied. If the termination condition is not satisfied (NO in step S1008), the camera parameter determination unit 904 proceeds to the processing of step S1009 to modify the camera parameter set $C_{ar}$. If the termination condition is satisfied (YES in step S1008), the camera parameter determination unit 904 terminates the process for updating the camera parameter set $C_{ar}$, determines the updated, latest camera parameter set $C_{ar}$ as the camera parameter set of the camera 101, and outputs the determined camera parameter set $C_{ar}$. Then, the camera parameter determination unit 904 proceeds to the processing of step S1010. The termination condition includes at least one of the conditions in which a given search range of camera parameters has been searched, the evaluation value J is less than a first threshold, and the number of times r the processing of steps S1006 to S1009 has been repeatedly performed is greater than a second threshold.

In step S1009, the camera parameter determination unit 904 modifies, or updates, the camera parameter set in the ((r+1)-th iteration. Specifically, the camera parameter determination unit 904 modifies the camera parameter set $C_{ar}$ of the camera 101 within a given range and calculates a new camera parameter set $C_{ar+1}$. The camera parameter determination unit 904 outputs the camera parameter set $C_{ar+1}$ and then returns to the processing of step S1006. Accordingly, the (r+1)-th iteration of the series of the processing of steps S1006 to S1009 is performed. The search range of camera parameters may be a preset range that the camera parameter $C_{ar}$ can take. For example, the search range may be ±5% of the initial camera parameter.

In step S1010, the camera parameter output unit 905 acquires pairs including camera parameter sets of the camera 101 calculated through the iteration of the processing of steps S1006 to S1009 described above and the evaluation values J corresponding to the camera parameter sets. The evaluation values J and the camera parameter sets are in a one-to-one relationship. Each of the evaluation values J is calculated by using the camera parameter set corresponding to the evaluation value J. The camera parameter output unit 905 selects a camera parameter set included in the pair having the smallest evaluation value J from among the pairs of camera parameter sets and evaluation values J. If the evaluation value J corresponding to the selected camera parameter set is smaller than the evaluation value J corresponding to the initial camera parameter set, the camera parameter output unit 905 replaces the initial camera parameter set stored in the camera parameter storage unit 112 with the selected camera parameter set. In this way, the camera parameter set of the camera 101 is updated to an optimum camera parameter set. The operation of steps S1006 to S1010 described above can be expressed by equation (11) below. The processing of steps S1001 to S1010 may be executed by the computers 300 and 400 illustrated in FIG. 5.

$$\underset{C_{ar}}{\mathrm{argmin}}(J) = \underset{C_{ar}}{\mathrm{argmin}} \frac{1}{N} \sum_{n=1}^{N} |I_a(u_{arn}, v_{arn}) - I_b(u_{brn}, v_{brn})| \quad (11)$$

$$(u_{arn}, v_{arn}) = G(x_{arn}, y_{arn}, z_{arn}, C_{ar}) \ r = 0 \dots R, n = 1 \dots N$$

$$(u_{brn}, v_{brn}) = H(x_{arn}, y_{arn}, z_{arn}, C_{ar}, C_b) \ r = 0 \dots R, n = 1 \dots N$$

$$(x_{arn}, y_{arn}, z_{arn}) = F(u_{an}, v_{an}, u_{bn}, C_{ar}, C_b)$$

As described above, the camera parameter set calculation apparatus 111 performs the calibration process S111 to calculate a three-dimensional coordinate set of a point (distance measurement point) on the subject corresponding to each of the pairs of corresponding points from the respective camera images of the camera 101 and the calibration camera 131 by using stereoscopic distance measurement. Further, the camera parameter set calculation apparatus 111 calculates a pixel coordinate pair of a first projected point obtained by projecting the distance measurement point onto the camera image $I_a$ and a pixel coordinate pair of a second projected point obtained by projecting the same distance measurement point onto the camera image $I_b$. Further, the camera parameter set calculation apparatus 111 calculates an evaluation value on the basis of a difference between the pixel value of the first projected point and the pixel value of the second projected point. The camera parameter set calculation apparatus 111 calculates the camera parameter set $C_{ar}$ of the camera 101 for which a minimum evaluation value is obtained, thereby obtaining a camera parameter set of the camera 101 having the correct values or having a small error from the correct values.

If the camera parameter set $C_{ar}$ of the camera 101 is correct, that is, if the camera parameter set $C_{ar}$ of the camera 101 has the true values, the three-dimensional coordinate set $(x_{arn}, y_{arn}, z_{arn})$ corresponding to the pair of corresponding points is correct. In addition, the pixel value $I_a(u_{arn}, v_{arn})$ of the first projected point in the camera image of the camera 101 and the pixel value $I_b(u_{brn}, v_{brn})$ of the second projected point in the camera image of the calibration camera 131, which correspond to the three-dimensional coordinate set, are equal, and the evaluation value J given by equation (10) above is 0. In contrast, when the camera parameter set $C_{ar}$ is farther away from the correct values (i.e., as the error of the camera parameter set $C_{ar}$ from the correct values increases), a larger difference occurs between the pixel values, making the evaluation value J given by equation (10) greater. In other words, the smaller the evaluation value J, the closer the camera parameter set $C_{ar}$ is to the true. Accordingly, through the operation of steps S1001 to S1010 described above, the camera parameter set $C_{ar}$ is determined in such a way that the total sum of the absolute values of the differences is minimized, each of the absolutes values of the differences being based on a difference between the pixel value $I_a(u_{arn}, v_{arn})$ and the pixel value $I_b(u_{brn}, v_{brn})$ corresponding to the three-dimensional coordinate set $(x_{arn}, y_{arn}, z_{arn})$, thereby determining a correct camera parameter set of the camera 101. That is, the camera 101 can be calibrated.

The operation of the camera system 10 for calibration described above does not require associations between a point whose three-dimensional coordinate set is known, such as a reference point on a calibration marker, and a pixel coordinate pair. Thus, the operation has the advantage of requiring no equipment such as calibration marker. In addition, the operation uses no specific subject whose three-dimensional coordinate set is known, and thus has the operation of achieving correct camera calibration even if the three-dimensional coordinate set of a specific subject is changed due to, for example, changes over time, deformation under external force, or temperature changes.

In the example illustrated in FIG. 3 described above, the calibration camera 131 of the calibration-image capturing unit 130 is fixed to the target object 2, which is a pillar fixed to the ground, and is arranged at a position near the camera 101 in the motor vehicle 1. However, the position of the calibration camera 131 is not limited to that in this example. The calibration camera 131 may be arranged at any position so long as the imaging area of the camera 101 to be calibrated, which is the field of view of the camera 101, and the imaging area of the calibration camera 131, which is the field of view of the calibration camera 131, overlap each other.

Figure 13:
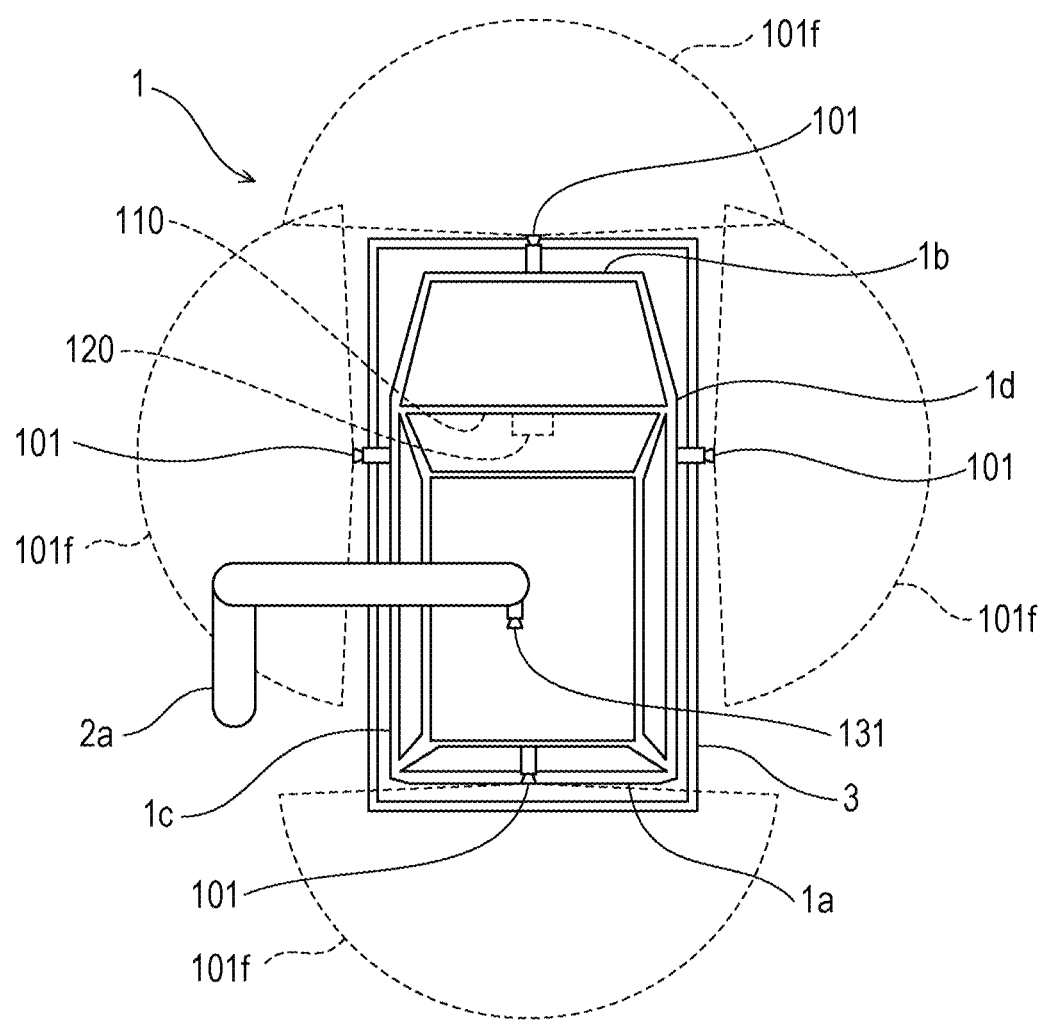
FIG. 13 is a plan view of a motor vehicle including the camera system according to the embodiment in another example.

For example, as illustrated in FIG. 13, the calibration camera 131 of the calibration-image capturing unit 130 may be fixed to a position above the motor vehicle 1 and arranged so as to have an imaging area that covers not only an area behind the motor vehicle 1 but also areas in front of and to the left and right of the motor vehicle 1. In this case, the calibration camera 131 may be fixed to a target object 2a, which is a pillar extending to above the motor vehicle 1. When the calibration camera 131 is arranged in the manner illustrated in FIG. 13, if the motor vehicle 1 includes cameras 101 in the front portion 1b, the rear portion 1a, the left side portion 1c, and the right side portion 1d, the field of view of the calibration camera 131 may overlap the respective fields of view of the four cameras 101. Therefore, it is possible to perform camera calibration of the four cameras 101 without moving the motor vehicle 1 that is parked in a predetermined position and orientation in accordance with the markings 3 as a position indicator.

3-1. Modification of Calibration Operation

In the calibration process S111, in step S1006, the camera parameter set calculation apparatus 111 according to the embodiment extracts N pairs of corresponding points in the camera images $I_a$ and $I_b$ and calculates three-dimensional coordinate sets of points (distance measurement points) on a subject, the extracted N pairs of corresponding points and the three-dimensional coordinate sets of points being in a one-to-one relationship, in accordance with the stereoscopic distance measurement technique. Then, in step S1007, the camera parameter set calculation apparatus 111 calculates an evaluation value J by using the three-dimensional coordinate sets of the N distance measurement points. However, not all of the distance measurement points may be used to calculate an evaluation value J.

In this modification, the camera parameter set calculation apparatus 111 removes three-dimensional coordinate sets of distance measurement points associated with no or negligibly small brightness gradient of an image among the three-dimensional coordinate sets of the N distance measurement points calculated by using stereoscopic distance measurement. Thus, the number of distance measurement points to be used for the calculation of an evaluation value J is reduced to reduce the amount of computation required for the camera parameter set calculation apparatus 111 to calculate an evaluation value J.

The calibration process of the camera parameter set calculation apparatus 111 according to this modification is similar to that according to the embodiment, except for the operation of step S1007. Thus, the operation of step S1007 according to this modification will be described and the description of the other operations will be omitted.

In step S1007, the evaluation value calculation unit 903 of the camera parameter set calculation apparatus 111 calculates a pixel coordinate pair of a first projected point, which is obtained by projecting a distance measurement point onto the camera image $I_a$ of the camera 101, and a pixel coordinate pair of a second projected point, which is obtained by projecting the same distance measurement point onto the camera image $I_b$ of the calibration camera 131, in accordance with equations (8) and (9) above by using the three-dimensional coordinate sets of the N distance measurement points and the respective camera parameter sets $C_{ar}$ and $C_b$ of the camera 101 and the calibration camera 131. Specifically, the evaluation value calculation unit 903 calculates the pixel coordinate pair ($u_{arn}$, $y_{arn}$) of the first projected point, which is obtained by projecting the n-th distance measurement point onto the camera image $I_a$, and the pixel coordinate pair ($u_{brn}$, $v_{brn}$) of the second projected point, which is obtained by projecting the n-th distance measurement point onto the camera image $I_b$.

Further, the evaluation value calculation unit 903 removes a distance measurement point associated with a pixel value with zero or negligibly small brightness gradient at the pixel coordinate pair ($u_{arn}$, $y_{arn}$) of the first projected point in the camera image $I_a$ among the N distance measurement points. If M distance measurement points (M> or =0) are to be removed, the evaluation value calculation unit 903 selects three-dimensional coordinate sets of (N−M) distance measurement points. An example of the brightness gradient of a pixel value at the pixel coordinate pair ($u_{arn}$, $y_{arn}$) of the first projected point is a brightness gradient between the pixel value at the pixel coordinate pair ($u_{arn}$, $y_{arn}$) of the first projected point and pixel values at pixel coordinate pairs around the pixel coordinate pair ($u_{arn}$, $v_{arn}$) of the first projected point.

If a brightness gradient of a pixel coordinate pair ($u_{arn}$, $y_{arn}$) corresponding to the three-dimensional coordinate set ($x_{arn}$, $y_{arn}$, $z_{arn}$) of the n-th distance measurement point is zero, a slight change (du, dv) in pixel coordinates from the pixel coordinate pair ($u_{arn}$, $y_{arn}$) corresponding to this distance measurement point, in accordance with a slight change in camera parameter, does not cause a difference between the pixel value $I_a(u_{arn}, v_{arn})$ at the pixel coordinate pair and a pixel value $I_a(u_{arn}+du, v_{arn}+dv)$. In other words, the evaluation value J does not change. The removal of such a distance measurement point has no effect on the evaluation value J. In addition, the number of distance measurement points is reduced. Thus, there is an advantage in reducing the amount of computation performed in step S1007.

Note that another technique may be used to reduce the number of distance measurement points to be used for the calculation of an evaluation value J in step S1007. For example, a distance measurement point that does not appear in a camera image captured by one of the camera 101 and the calibration camera 131 may be removed from among the distance measurement points. In this case, pixel coordinate pairs of projected points in the camera images $I_a$ and $I_b$ corresponding to a three-dimensional coordinate set of a distance measurement point may be calculated, and, when one of the two pixel coordinate pairs is located within an invisible region on the corresponding camera image, the distance measurement point may be removed from among the distance measurement points to be used for the calculation of an evaluation value J.

Equation (10) above indicates that when the same distance measurement point appears in the two camera images $I_a$ and $I_b$, the difference between pixel values of the projected points of the distance measurement point in the camera images $I_a$ and $I_b$ is 0. When one of the projected points of the distance measurement point in the camera images $I_a$ and $I_b$ is located outside the imaging area of the camera 101 and the calibration camera 131, or when one of the projected points of the distance measurement point in the camera images $I_a$ and $I_b$ is located within the imaging area but is occluded by some other object and thus does not appear in the corresponding one of the camera images $I_a$ and $I_b$, that is, when one of the projected points of the distance measurement point in the camera images $I_a$ and $I_b$ is located within an occlusion region, the difference between the pixel values of the two projected points is not 0 but constitutes an error in evaluation value. Thus, a distance measurement point whose projected point does not appear in at least one of the camera images $I_a$ and $I_b$, or is located within an invisible region on the corresponding camera image(s), is removed from the distance measurement points to be used for the calculation of an evaluation value. Thus, there is expected to be an advantage in reducing the error in evaluation value. The determination of whether projected points of a distance measurement point are located within an invisible region on camera images may be based on the occlusion information described above, which specifies the range of a three-dimensional space outside an imaging area of a camera.

In step S1008 in the calibration process S111 of the camera parameter set calculation apparatus 111, iterative computation is terminated in accordance with termination conditions such as a condition in which the evaluation value J is smaller than a first threshold and a condition in which the number of iterations r of the processing is greater than a second threshold. However, the condition for terminating the iterative computation is not limited to this. For example, any other termination condition may be additionally used. For example, a condition in which the evaluation value J does not change when the camera parameter set is changed may be used as a termination condition.

In the calibration process S111 of the camera parameter set calculation apparatus 111, when the evaluation function for the evaluation value J satisfies the two conditions described above, a camera parameter for which the evaluation value J is small, that is, a camera parameter having a small difference, or a small error, from the correct value, can be calculated to perform updating. If the evaluation function does not satisfy the two conditions described above, however, a camera parameter with a small error is not always calculated. For example, when the area to be imaged by a camera is extremely dark and all the pixel values in the area are 0, or when a subject has uniform color with no texture, the evaluation value J given by equation (10) above does not change if the camera parameter of the camera is changed, that is, the evaluation value J has a constant value (for example, 0). If the camera parameter set calculation apparatus 111 acquires such a camera image, in the calibration process S111, the iterative process is not completed until the number of iterations r of the processing of steps S1006 to S1009 becomes greater than or equal to the second threshold. During the iterative process, the evaluation value remains unchanged and is not updated. In this case, the process imposes a computation load on the camera parameter set calculation apparatus 111 even though the camera parameter is not updated. In contrast, the iterative process ends when the evaluation value does not change if the camera parameter is changed, thereby achieving an advantage that the computation load can be reduced.

4. Evaluation Function Variations

In the calibration processes according to the embodiment and the modification, as given by equation (10) above, an evaluation function based on the sum of the absolute values of the differences between pixel values of projected points corresponding to multiple distance measurement points is applied to an evaluation value J to be used in the calibration process S111 of the camera parameter set calculation apparatus 111. However, the evaluation function is not limited to that described above, and any other function based on a difference between pixel values of projected points in two camera images corresponding to a distance measurement point may be used. The evaluation function may be, for example, an evaluation function that uses the total sum of squares of the differences between pixel values of two projected points corresponding to multiple distance measurement points. Specifically, for each distance measurement point, the square of a difference between a pixel value at a first projected point obtained by projecting the distance measurement point onto the camera image $I_a$ and a pixel value at a second projected point obtained by projecting the same distance measurement point onto the camera image $I_b$ is determined and the resulting values for the distance measurement points are added together to determine an evaluation function. An example of such an evaluation function is given by equation (12) as follows.

$$J = \frac{1}{N}\sum_{k=1}^{N}\{I_a(u_{arn},v_{arn}) - I_b(u_{brn},v_{brn})\}^2 \tag{12}$$

A camera parameter calculated based on an evaluation value defined by the sum of the absolute values of differences between pixel values, as given by equation (10) above, is close to the true value, that is, has a small error from the true value, if the differences between the pixel values have a Laplace distribution. Such advantages can be expected.

In contrast, a camera parameter calculated based on an evaluation value defined by the sum of the squares of differences between pixel values, as given by equation (12) above, is close to the true value, that is, has a small error from the true value, if errors of the pixel values have a Gaussian distribution. Such advantages can be expected.

Others

While a camera parameter set calculation apparatus and the like according to one or more aspects of the present disclosure have been described with reference to an embodiment and so on, the present disclosure is not limited to the embodiment and the like. Various modifications conceivable to a person skilled in the art may be made to this embodiment and the like and constituent elements in different embodiments may be combined into other embodiments without departing from the gist of the present disclosure. Such modifications and embodiments may also be included in the scope of one or more aspects of the present disclosure.

In the embodiment and modification, the image capturing unit 100 includes one camera 101. However, the number of cameras is not limited to one. It is desirable that the image capturing unit 100 include at least one camera to achieve calibration according to embodiments of the present disclosure, and the image capturing unit 100 may include two or more cameras. In this case, in the camera parameter set calculation apparatus, one of the two or more cameras and the calibration camera 131 perform camera calibration on the one camera. The two or more cameras may be combined into a single unit or may be disposed separately. In addition, while the calibration-image capturing unit 130 includes one calibration camera 131, it is desirable that the calibration camera 131 include at least one calibration camera 131. The calibration-image capturing unit 130 may include two or more calibration cameras 131. In this case, in the camera parameter set calculation apparatus, all or some of the two or more calibration cameras 131 and the camera 101 may perform camera calibration on the camera 101. As the number of calibration cameras 131 used for camera calibration increases, the calibration accuracy of the camera 101 may be improved.

In the embodiment and modification, as a non-limiting example, an image capturing unit, an image processing unit, and a display in a camera system are mounted on a motor vehicle, and a camera parameter set calculation apparatus included in the image processing unit is also mounted on the motor vehicle. For example, the image capturing unit, the image processing unit, and the display may be mounted on any mobile apparatus other than a motor vehicle. Examples of the mobile apparatus may include a vehicle other than a motor vehicle, a ship, an aerial vehicle, and a robot. Examples of the vehicle other than a motor vehicle may include a truck, a bus, a two-wheeled vehicle, a vehicle for conveyance, a railroad, a construction machine, and cargo-handling equipment. Examples of the aerial vehicle may include an aircraft and a drone. The robot may be remotely controlled by a user.

The camera parameter set calculation apparatus may be implemented as a computer installed in a different location connected to the motor vehicle via a network. Due to the large computation load, a calibration process for camera parameters, which is performed by the camera parameter set calculation apparatus, is implemented by a computer having high computation capacities, such as a server, rather than by a computer mounted on a motor vehicle with limited computation capacities, thereby achieving an advantage that camera parameters can be calculated with higher accuracy within a shorter time period for computation.

As described above, the technique disclosed herein may be implemented by a system, an apparatus, a method, an integrated circuit, a computer program, or a computer-readable recording medium such as a recording disc, or may be implemented by any combination of the system, the apparatus, the method, the integrated circuit, the computer program, and the recording medium. Examples of the computer-readable recording medium include a non-volatile recording medium such as a CD-ROM.

For example, the constituent elements included in a camera system according to the embodiment described above are typically implemented as an integrated circuit, namely, large scale integration (LSI). These constituent elements may be formed as individual chips or some or all of the constituent elements may be integrated into a single chip.

The technique for forming an integrated circuit is not limited to LSI and may be implemented by using a dedicated circuit or a general-purpose processor. A field programmable gate array (FPGA), which is programmable after LSI manufacturing, or a reconfigurable processor which allows reconfiguration of connections and/or settings of circuit cells in an LSI device after LSI manufacturing may be used.

In the embodiment described above, each of the constituent elements may be implemented by dedicated hardware or may be implemented by executing a software program suitable for each constituent element. Each constituent element may be implemented by a program execution unit such as a CPU or a processor reading and executing a software program recorded on a recording medium such as a hard disk or a semiconductor memory.

Some or all of the constituent elements described above may be constituted by a removable integrated circuit (IC) card or a single module. The IC card or the module is a computer system including a microprocessor, a ROM, a RAM, and so on. The IC card or the module may include the LSI described above or a system LSI. The microprocessor operates in accordance with a computer program, thereby allowing the IC card or the module to achieve its functions. The IC card and the module may be tamper-resistant.

A camera parameter set calculation method according to an embodiment of the present disclosure may be implemented by a micro processing unit (MPU), a CPU, a processor, a circuit such as an LSI device, an IC card, a stand-alone module, or the like.

The technique disclosed herein may also be implemented by a software program or a digital signal including the software program, or may be implemented by a non-transitory computer-readable recording medium storing the program. It should be understood that the program can be distributed via a transmission medium such as the Internet.

The numerals used in the foregoing description, such as ordinal numbers and quantities, are all illustrative for describing the technique disclosed herein, and the present disclosure is not limited to the numerals given for illustrative purposes. In addition, connections between constituent elements are illustrative for describing the technique disclosed herein, and connections for achieving the functionality disclosed herein are not limited thereto.

Additionally, the division into functional blocks in the block diagrams is illustrative. Multiple functional blocks may be implemented as a single functional block, or a single functional block may be divided into multiple sections. Alternatively, some functions may be transferred from one functional block to another. Furthermore, the functions of multiple functional blocks having similar functions may be executed in parallel or in a time-sharing manner by a single piece of hardware or software.

A camera parameter calculation apparatus and the like according to embodiments of the present disclosure are suitable for use in the calculation of camera parameters of at least one camera.

What is claimed is:

1. A camera parameter set calculation apparatus comprising:
    a control circuit, wherein the control circuit
        (a1) acquires a first image captured by a first camera mounted on a mobile apparatus after the mobile apparatus stops at a predetermined location and a second image captured by a second camera arranged on or in an object different from the mobile apparatus in such a manner that an absolute position of the second camera remains fixed to the object,
        (a2) acquires a first camera parameter set of the first camera and a second camera parameter set of the second camera,
        (a3) calculates three-dimensional coordinate sets based on the first image, the second image, the first camera parameter set, and the second camera parameter set,
        (a4) determines (i) first pixel coordinate pairs obtained by projecting the three-dimensional coordinate sets onto the first image based on the first camera parameter set and (ii) second pixel coordinate pairs obtained by projecting the three-dimensional coordinate sets onto the second image based on the second camera parameter set,
        (a5) calculates an evaluation value based on pixel values at the first pixel coordinate pairs in the first image and pixel values at the second pixel coordinate pairs in the second image, (a6) updates the first camera parameter set based on the evaluation value, and
(a7) outputs the updated first camera parameter set, wherein
the three-dimensional coordinate sets are represented by (x1, y1, z1), ... (xi, yi, zi), ..., and (xn, yn, zn), the first pixel coordinate pairs are represented by (u11, v11), ... (u1i, v1i), ..., and (u1n, v1n), the second pixel coordinate pairs are represented by (u21, v21), ... (u2i, v2i), ..., and (u2n, v2n), where $1 \leq i \leq n$, the i and the n being natural numbers, the (xi, yi, zi) corresponds to the (u1i, v1i), the (xi, yi, zi) corresponds to the (u2i, v2i), a pixel value at the (u1i, v1i) is represented by I1(u1i, v1i), and a pixel value at the (u2i, v2i) is represented by I2(u2i, v2i), and
in the (a5), the control circuit calculates the evaluation value based on a difference Di between the I1(u1i, v1i) and the I2(u2i, v2i).

2. The camera parameter set calculation apparatus according to claim 1, wherein the first pixel coordinate pairs and the three-dimensional coordinate sets are in a one-to-one relationship and the second pixel coordinate pairs and the three-dimensional coordinate sets are in a one-to-one relationship, and
wherein in the (a4),
the control circuit determines each of the first pixel coordinate pairs by performing coordinate transformation on a corresponding three-dimensional coordinate set by using one or more camera parameters included in the first camera parameter set, and determines each of the second pixel coordinate pairs by performing coordinate transformation on a corresponding three-dimensional coordinate set by using one or more camera parameters included in the second camera parameter set.

3. The camera parameter set calculation apparatus according to claim 1, wherein the (a3) includes
(a3-1) extracting pairs of corresponding points, each of the pairs of corresponding points including a first corresponding point included in the first image and a second corresponding point included in the second image, based on a pixel value at the first corresponding point and a pixel value at the second corresponding point, images of an identical point on a subject being shown at the first corresponding point and the second corresponding point, and
(a3-2) calculating the three-dimensional coordinate sets based on the pairs of corresponding points, the first camera parameter set, and the second camera parameter set, the three-dimensional coordinate sets and the pairs of corresponding points being in a one-to-one relationship.

4. The camera parameter set calculation apparatus according to claim 1, wherein in the (a5), the control circuit calculates the evaluation value based on $\Sigma_{i=1}^{n} Di$.

5. The camera parameter set calculation apparatus according to claim 1, wherein in the (a5), the control circuit calculates the evaluation value based on $\Sigma_{i=1}^{n} |Di|$.

6. The camera parameter set calculation apparatus according to claim 1, wherein in the (a5), the control circuit calculates the evaluation value based on $\Sigma_{i=1}^{n} (Di \times Di)$.

7. The camera parameter set calculation apparatus according to claim 1, wherein the absolute position is a position relative to the Earth.

8. A camera parameter set calculation method comprising:
(a1) acquiring a first image captured by a first camera mounted on a mobile apparatus after the mobile apparatus stops at a predetermined location and a second image captured by a second camera arranged on or in an object different from the mobile apparatus in such a manner that an absolute position of the second camera remains fixed to the object;
(a2) acquiring a first camera parameter set of the first camera and a second camera parameter set of the second camera;
(a3) calculating three-dimensional coordinate sets based on the first image, the second image, the first camera parameter set, and the second camera parameter set;
(a4) determining (i) first pixel coordinate pairs obtained by projecting the three-dimensional coordinate sets onto the first image based on the first camera parameter set and (ii) second pixel coordinate pairs obtained by projecting the three-dimensional coordinate sets onto the second image based on the second camera parameter set;
(a5) calculating an evaluation value based on pixel values at the first pixel coordinate pairs in the first image and pixel values at the second pixel coordinate pairs in the second image;
(a6) updating the first camera parameter set based on the evaluation value; and
(a7) outputting the updated first camera parameter set, wherein at least one of the (a1) to (a7) is executed by a processor, and wherein
the three-dimensional coordinate sets are represented by (x1, y1, z1), ... (xi, yi, zi), ..., and (xn, yn, zn), the first pixel coordinate pairs are represented by (u11, v11), ... (u1i, v1i), ..., and (u1n, v1n), the second pixel coordinate pairs are represented by (u21, v21), ... (u2i, v2i), ..., and (u2n, v2n), where $1 \leq i \leq n$, the i and the n being natural numbers, the (xi, yi, zi) corresponds to the (u1i, v1i), the (xi, yi, zi) corresponds to the (u2i, v2i), a pixel value at the (u1i, v1i) is represented by I1(u1i, v1i), and a pixel value at the (u2i, v2i) is represented by I2(u2i, v2i), and
in the (a5), the evaluation value is calculated based on a difference Di between the I1(u1i, v1i) and the I2(u2i, v2i).

9. The camera parameter set calculation method according to claim 8,
wherein the first pixel coordinate pairs and the three-dimensional coordinate sets are in a one-to-one relationship and the second pixel coordinate pairs and the three-dimensional coordinate sets are in a one-to-one relationship, and
wherein in the (a4), each of the first pixel coordinate pairs is determined by performing coordinate transformation on a corresponding three-dimensional coordinate set by using one or more camera parameters included in the first camera parameter set, and each of the second pixel coordinate pairs is determined by performing coordinate transformation on a corresponding three-dimensional coordinate set by using one or more camera parameters included in the second camera parameter set.

10. The camera parameter set calculation method according to claim 8, wherein the (a3) includes
(a3-1) extracting pairs of corresponding points, each of the pairs of corresponding points including a first corresponding point included in the first image and a second corresponding point included in the second image, based on a pixel value at the first corresponding point and a pixel value at the second corresponding point, images of an identical point on a subject being shown at the first corresponding point and the second corresponding point, and (a3-2) calculating the three-dimensional coordinate sets based on the pairs of corresponding points, the first camera parameter set, and the second camera parameter set, the three-dimensional coordinate sets and the pairs of corresponding points being in a one-to-one relationship.

11. The camera parameter set calculation method according to claim 8, wherein in the (a5), the evaluation value is calculated based on $\Sigma_{i=1}^{n} Di$.

12. The camera parameter set calculation method according to claim 8, wherein in the (a5), the evaluation value is calculated based on $\Sigma_{i=1}^{n} |Di|$.

13. The camera parameter set calculation method according to claim 8, wherein in the (a5), the evaluation value is calculated based on $\Sigma_{i=1}^{n} (Di \times Di)$.

14. The camera parameter set calculation method according to claim 8, wherein the absolute position is a position relative to the Earth.

15. A non-transitory computer-readable recording medium storing a control program for causing a device including a processor to execute a process, the process comprising:

(a1) acquiring a first image captured by a first camera after a mobile apparatus stops at a predetermined location and a second image captured by a second camera, the first camera being mounted on the mobile apparatus, the second camera being arranged on or in an object different from the mobile apparatus in such a manner that an absolute position of the second camera remains fixed to the object;

(a2) acquiring a first camera parameter set of the first camera and a second camera parameter set of the second camera;

(a3) calculating three-dimensional coordinate sets based on the first image, the second image, the first camera parameter set, and the second camera parameter set;

(a4) determining (i) first pixel coordinate pairs obtained by projecting the three-dimensional coordinate sets onto the first image based on the first camera parameter set and (ii) second pixel coordinate pairs obtained by projecting the three-dimensional coordinate sets onto the second image based on the second camera parameter set;

(a5) calculating an evaluation value based on pixel values at the first pixel coordinate pairs in the first image and pixel values at the second pixel coordinate pairs in the second image;

(a6) updating the first camera parameter set based on the evaluation value; and (a7) outputting the updated first camera parameter set, wherein the three-dimensional coordinate sets are represented by $(x1, y1, z1), \ldots (xi, yi, zi), \ldots,$ and $(xn, yn, zn)$, the first pixel coordinate pairs are represented by $(u11, v11), \ldots (u1i, v1i), \ldots,$ and $(u1n, v1n)$, the second pixel coordinate pairs are represented by $(u21, v21), \ldots (u2i, v2i), \ldots,$ and $(u2n, v2n)$, where $1 \leq i \leq n$, the i and the n being natural numbers, the $(xi, yi, zi)$ corresponds to the $(u1i, v1i)$, the $(xi, yi, zi)$ corresponds to the $(u2i, v2i)$, a pixel value at the $(u1i, v1i)$ is represented by $I1(u1i, v1i)$, and a pixel value at the $(u2i, v2i)$ is represented by $I2(u2i, v2i)$, and in the (a5), the evaluation value is calculated based on a difference Di between the $I1(u1i, v1i)$ and the $I2(u2i, v2i)$.

* * * * *